US011310757B2

United States Patent
Yu et al.

(10) Patent No.: US 11,310,757 B2
(45) Date of Patent: Apr. 19, 2022

(54) TIME SYNCHRONIZATION METHOD AND APPARATUS

(71) Applicant: Huawei Technologies Co., Ltd., Shenzhen (CN)

(72) Inventors: Feng Yu, Beijing (CN); Haifeng Yu, Beijing (CN); Bo Lin, Beijing (CN); Guangwei Yu, Beijing (CN); Feng Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 15 days.

(21) Appl. No.: 16/874,746

(22) Filed: May 15, 2020

(65) Prior Publication Data
US 2020/0280943 A1    Sep. 3, 2020

Related U.S. Application Data

(63) Continuation of application No. PCT/CN2018/076780, filed on Feb. 13, 2018.

(30) Foreign Application Priority Data

Nov. 16, 2017 (WO) ................ PCT/CN2017/111470

(51) Int. Cl.
*H04W 56/00* (2009.01)
*H04W 76/27* (2018.01)
*H04W 80/02* (2009.01)

(52) U.S. Cl.
CPC ....... *H04W 56/006* (2013.01); *H04W 56/005* (2013.01); *H04W 76/27* (2018.02); *H04W 80/02* (2013.01)

(58) Field of Classification Search
CPC . H04W 56/006; H04W 76/27; H04W 56/005; H04W 80/02; H04W 56/0015;
(Continued)

(56) References Cited

U.S. PATENT DOCUMENTS

2004/0228428 A1    11/2004  Cho
2005/0080561 A1     4/2005  Abraham et al.
(Continued)

FOREIGN PATENT DOCUMENTS

AU     2011221736 B2    1/2015
CN      101075848 A    11/2007
(Continued)

OTHER PUBLICATIONS

Yoon, Jun-yong, et al. "A TDoA-based localization using precise time-synchronization." 2012 14th International Conference on Advanced Communication Technology (ICACT). IEEE, 2012 (Year: 2012).*
(Continued)

*Primary Examiner* — Sharad Rampuria
(74) *Attorney, Agent, or Firm* — Slater Matsil, LLP

(57) ABSTRACT

A time synchronization method and an apparatus are disclosed. The method includes: receiving, by a terminal device, a first time sent by an access network device; obtaining a first transmission delay; obtaining a fourth time based on the first transmission delay and the first time; and synchronizing a time of the terminal device based on the fourth time.

16 Claims, 20 Drawing Sheets

(58) Field of Classification Search
CPC ..... H04W 56/00; H04W 72/04; H04W 72/12; H04W 76/00; H04B 7/2121; H04B 7/2123; H04J 2203/0069; H04Q 2213/394
See application file for complete search history.

(56) References Cited

U.S. PATENT DOCUMENTS

| | | | |
|---|---|---|---|
| 2005/0095982 | A1 | 5/2005 | Blanchard et al. |
| 2013/0336307 | A1 | 12/2013 | Park et al. |
| 2015/0260864 | A1 | 9/2015 | Guichard et al. |
| 2020/0084738 | A1* | 3/2020 | Nguyen ............. H04W 64/003 |

FOREIGN PATENT DOCUMENTS

| | | |
|---|---|---|
| CN | 101146257 A | 3/2008 |
| CN | 101442799 A | 5/2009 |
| CN | 101510801 A | 8/2009 |
| CN | 101729127 A | 6/2010 |
| CN | 101917761 A | 12/2010 |
| CN | 102056283 A | 5/2011 |
| CN | 102056284 A | 5/2011 |
| CN | 102083194 A | 6/2011 |
| CN | 102104978 A | 6/2011 |
| CN | 103796296 A | 5/2014 |
| CN | 105554870 A | 5/2016 |
| EP | 2975792 A1 | 1/2016 |
| WO | 2017071276 A1 | 5/2017 |

OTHER PUBLICATIONS

Manolakis, Konstantinos, et al. "A closed concept for synchronization and cell search in 3GPP LTE systems." 2009 IEEE Wireless Communications and Networking Conference. IEEE, 2009. (Year: 2009).*

3rd Generation Partnership Project, Technical Specification Group Services and System Aspects, Study on Communication for Automation in Vertical Domains, (Release 15), 3GPP TR 22.804 V0.2.0 (Aug. 2017), 91 pages.

3rd Generation Partnership Project, Technical Specification Group Core Network and Terminals, Mobile radio interface Layer 3 specification, Core network protocols, Stage 3 (Release 15), 3GPP TS 24.008 V15.0.0 (Sep. 2017), 782 pages.

3rd Generation Partnership Project, Technical Specification Group Core Network and Terminals, Non-Access-Stratum (NAS) protocol for Evolved Packet System (EPS), Stage 3 (Release 15), 3GPP TS 24.301 V15.0.1 (Sep. 2017), 496 pages.

3rd Generation Partnership Project, Technical Specification Group Radio Access Network, Evolved Universal Terrestrial Radio Access (E-UTRA), Radio Resource Control (RRC), Protocol specification (Release 14), 3GPP TS 36.331 V14.4.0 (Sep. 2017), 753 pages.

3rd Generation Partnership Project, Technical Specification Group Radio Access Network, NR, Medium Access Control (MAC) protocol specification (Release 15), 3GPP TS 38.321 V1.0.0 (Sep. 2017), 46 pages.

3rd Generation Partnership Project, Technical Specification Group Radio Access Network, NR, Radio Resource Control (RRC), Protocol specification (Release 15), 3GPP TS 38.331 V0.1.0 (Oct. 2017), 42 pages.

* cited by examiner

```
-- ASN1START
timeInfo-r15                    SEQUENCE {
    Year-Month-Date-Indicator   1bit    //indicating whether information about year, month, and day is sent in
current unicast
    timeInfoUTC-r15                 INTEGER (0..549755813887),
    dayLightSavingTime-r15          BIT STRING (SIZE (2))           OPTIONAL,   -- Need OR
    leapSeconds-r15                 INTEGER (-127..128)             OPTIONAL,   -- Need OR
    localTimeOffset-r15             INTEGER (-63..64)               OPTIONAL    -- Need OR
    timeInfo-r15                    INTEGER (0..xxxxxxxxxxx) // ns units or Ts units
..}
```

FIG. 11c

```
-- ASN1START
SystemInformationBlockType16-r11 ::=    SEQUENCE {
    timeInfo-r11                         SEQUENCE {
        timeInfoUTC-r11                   INTEGER (0..549755813887),
        dayLightSavingTime-r11            BIT STRING (SIZE (2))           OPTIONAL, -- Need OR
        leapSeconds-r11                   INTEGER (-127..128)             OPTIONAL, -- Need OR
        localTimeOffset-r11               INTEGER (-63..64)               OPTIONAL -- Need OR
    },
    timeInfo-r15                          INTEGER (0..9999) // 1us unit
..}
```

FIG. 12b

```
-- ASN1START
SystemInformationBlockType16-r11 ::=   SEQUENCE {
    timeInfo-r11                       SEQUENCE {
        timeInfoUTC-r11                INTEGER (0..549755813887),
        dayLightSavingTime-r11         BIT STRING (SIZE (2))    OPTIONAL,    -- Need OR
        leapSeconds-r11                INTEGER (-127..128)      OPTIONAL,    -- Need OR
        localTimeOffset-r11            INTEGER (-63..64)        OPTIONAL,   -- Need OR
        timeInfo-r15                   INTEGER (0..xxxxxx) // 1Ts unit
    }
...}
```

FIG. 12c

```
-- ASN1START
SystemInformationBlockType16-r11 ::=   SEQUENCE {
    timeInfo-r11                       SEQUENCE {
        timeInfoUTC-r11                INTEGER (0..549755813887), // 10ms units
        dayLightSavingTime-r11         BIT STRING (SIZE (2))          OPTIONAL,      -- Need OR
        leapSeconds-r11                INTEGER (-127..128)                    OPTIONAL,      -- Need
OR
        localTimeOffset-r11            INTEGER (-63..64)              OPTIONAL       -- Need OR
    AccuracyIndicator-r15              INTEGER (0..3 3)
    timeInfo-r15                       INTEGER (0..xxxxxx)    OPTIONAL   -- Need OR
```

FIG. 12d

```
-- ASN1START
SystemInformationBlockType16-r11 ::=   SEQUENCE {
    timeInfo-r11                        SEQUENCE {
        timeInfoUTC-r11                 INTEGER (0..549755813887), // 10ms units
        dayLightSavingTime-r11          BIT STRING (SIZE (2))             OPTIONAL, -- Need OR
        leapSeconds-r11                 INTEGER (-127..128)                         OPTIONAL,  --
Need OR
        localTimeOffset-r11             INTEGER (-63..64)                           OPTIONAL    --
Need OR
    AccuracyIndicator-r15               BIT STRING (SIZE (4) )
    timeInfo-r15                        INTEGER (0..xxxxxxx)     OPTIONAL    -- Need OR
```

FIG. 12e

TIME SYNCHRONIZATION METHOD AND APPARATUS

CROSS-REFERENCE TO RELATED APPLICATIONS

This application is a continuation of International Application No. PCT/CN2018/076780, filed on Feb. 13, 2018, which claims priority to Chinese Patent Application No. PCT/CN2017/111470, filed on Nov. 16, 2017. The applications of the aforementioned disclosures are hereby incorporated by reference in their entireties.

TECHNICAL FIELD

This disclosure relates to the field of wireless communications technologies, and in particular, to a time synchronization method and an apparatus.

BACKGROUND

As long term evolution (LTE) enters a stage of large-scale commercial use, a future-oriented 5th generation (5G) mobile communications system has become a global R&D hotspot. As a main driving force for development of future communication, the mobile internet and the internet of things will have a great impact on fields such as people's residence, work, leisure, and transportation, and service requirements will be diversified. As a result, time synchronization (also referred to as clock synchronization) needs to be established between a terminal and an access network device in a plurality of scenarios.

However, time accuracy of time synchronization between the terminal device and the access network device is not high. Consequently, time synchronization is not accurate enough, and an increasingly high service requirement cannot be satisfied.

SUMMARY

Embodiments of this disclosure provide a time synchronization method, to resolve a technical problem that time synchronization is not accurate enough.

According to a first aspect, an embodiment of this disclosure provides a time synchronization method. The method includes: receiving, by a terminal device, a first indication message sent by an access network device, where the first indication message includes time information; obtaining, by the terminal device, a first transmission delay, and obtaining a fourth time based on the first transmission delay and the time information; and synchronizing, by the terminal device, time of the terminal device based on the fourth time (synchronize the time).

In a possible design, before the terminal device receives the first indication message sent by the access network device, the terminal device sends a request message to the access network device, where the request message includes at least one of the following: demand information of the time information, granularity demand information of the time information, QoS information of a service supported by the terminal device, and a time type requested by the terminal device.

In a possible design, the first indication message further includes at least one of the following: a time information reference point; and a time type, where the time type corresponds to at least any one of UTC, a GPS time, and a local time.

In a possible design, the request message is a radio resource control RRC message, a media access control control element (MAC CE) message, or a random access request message.

In a possible design, the obtaining, by the terminal device, a first transmission delay includes: obtaining, by the terminal device, uplink timing advance information, and obtaining the first transmission delay based on the uplink timing advance information.

[Don] In a possible design, the obtaining, by the terminal device, uplink timing advance information includes: receiving, by the terminal device, a second indication message sent by the access network device, where the second indication message includes the uplink timing advance information; or receiving, by the terminal device, a third indication message sent by the access network device, where the third indication message includes uplink timing advance adjustment information; and updating, by the terminal device, current uplink timing advance information of the terminal device based on previous uplink timing advance information and the uplink timing advance adjustment information.

In a possible design, the second indication message is a random access request response message, an RRC message, or a MAC CE; and the third indication message is a MAC CE message or an RRC message.

In a possible design, the receiving, by a terminal device, a first indication message sent by an access network device includes: receiving, by the terminal device in a broadcast, unicast, or multicast manner, the first indication message sent by the access network device.

According to a second aspect, an embodiment of this disclosure provides a time synchronization method. The method includes: determining, by an access network device, time information; and sending, by the access network device, a first indication message to a terminal device, where the first indication message includes the time information, and the time information is used to synchronize time of the terminal device.

In a possible design, the determining, by an access network device, time information includes: receiving, by the access network device, a request message from the terminal device, where the request message includes at least one of the following: demand information of the time information, granularity demand information of the time information, QoS information of a service supported by the terminal device, and a time type requested by the terminal device; and determining, by the access network device, the time information based on the request message.

In a possible design, the determining, by an access network device, time information includes: obtaining, by the access network device, first indication information sent by a core network device, where the first indication information includes granularity demand information of the time information and/or QoS information of a service supported by the terminal device; and determining, by the access network device, the time information based on the first indication information.

In a possible design, the first indication message further includes at least one of the following: a time information reference point; and a time type, where the time type corresponds to at least any one of UTC, a GPS time, and a local time.

In a possible design, the request message is a radio resource control RRC message, a media access control control element MAC CE message, or a random access request message.

In a possible design, the sending, by the access network device, a first indication message to a terminal device includes: sending, by the access network device, the first indication message to the terminal device in a broadcast, unicast, or multicast manner.

In a possible design, before the sending, by the access network device, a first indication message to a terminal device, the method further includes: receiving, by the access network device, authorization information sent by the core network device, where the authorization information is used to indicate whether the terminal device can obtain the time information; and if the authorization information indicates that the terminal device can obtain the time information, sending, by the access network device, the first indication message to the terminal device; or if the authorization information indicates that the terminal device cannot obtain the time information, skipping sending, by the access network device, the first indication message to the terminal device.

According to a third aspect, an embodiment of this disclosure provides a time synchronization method. The method includes: receiving, by a terminal device, a first indication message sent by an access network device, where the first indication message includes time information of the terminal device, and a granularity of the time information is 1 us, 100 ns, or 1 ms; and synchronizing, by the terminal device, time of the terminal device based on the time information.

According to a fourth aspect, an embodiment of this disclosure provides a time synchronization method. The method includes: determining, by an access network device, time information, where a granularity of the time information is 1 us, 100 ns, or 1 ms; and sending, by the access network device, a first indication message to a terminal device, where the first indication message includes the time information.

According to a fifth aspect, an embodiment of this disclosure provides a terminal device. The terminal device includes: a transceiver module, configured to receive a first indication message sent by an access network device, where the first indication message includes time information; and a processing module, configured to: obtain a first transmission delay, obtain a fourth time based on the first transmission delay and the time information, and synchronize time of the terminal device based on the fourth time.

In a possible design, before receiving the first indication message sent by the access network device, the transceiver module is further configured to: send a request message to the access network device, where the request message includes at least one of the following: demand information of the time information, granularity demand information of the time information, QoS information of a service supported by the terminal device, and a time type requested by the terminal device.

In a possible design, the first indication message further includes at least one of the following: a time information reference point; and a time type, where the time type corresponds to at least any one of UTC, a GPS time, and a local time.

In a possible design, the request message is a radio resource control (RRC) message, a media access control control element (MAC CE) message, or a random access request message.

In a possible design, the processing module is specifically configured to: obtain uplink timing advance information, and obtain the first transmission delay based on the uplink timing advance information.

In a possible design, the processing module is specifically configured to: receive a second indication message sent by the access network device, where the second indication message includes the uplink timing advance information; or receive a third indication message sent by the access network device, where the third indication message includes uplink timing advance adjustment information; and update current uplink timing advance information of the terminal device based on previous uplink timing advance information and the uplink timing advance adjustment information.

In a possible design, the second indication message is a random access request response message, an RRC message, or a MAC CE; and the third indication message is a MAC CE message or an RRC message.

In a possible design, the transceiver module is specifically configured to: receive, in a broadcast, unicast, or multicast manner, the first indication message sent by the access network device.

According to a fifth aspect, an embodiment of this disclosure provides an access network device. The access network device includes: a processing module, configured to determine time information; and a transceiver module, configured to send a first indication message to a terminal device, where the first indication message includes the time information, and the time information is used to synchronize time of the terminal device.

In a possible design, the transceiver module is further configured to: receive a request message from the terminal device, where the request message includes at least one of the following: demand information of the time information, granularity demand information of the time information, QoS information of a service supported by the terminal device, and a time type requested by the terminal device; and the processing module is specifically configured to determine the time information based on the request message.

In a possible design, the transceiver module is further configured to: obtain first indication information sent by a core network device, where the first indication information includes granularity demand information of the time information and/or QoS information of a service supported by the terminal device; and the processing module is specifically configured to determine the time information based on the first indication information.

In a possible design, the first indication message further includes at least one of the following: a time information reference point; and a time type, where the time type corresponds to at least any one of universal time coordinated (UTC), a global positioning system (GPS) time, and a local time.

In a possible design, the request message is a radio resource control (RRC) message, a media access control control element (MAC CE) message, or a random access request message.

In a possible design, the transceiver module is specifically configured to: send the first indication message to the terminal device in a broadcast, unicast, or multicast manner.

In a possible design, before sending the first indication message to the terminal device, the transceiver module is further configured to: receive authorization information sent by the core network device, where the authorization information is used to indicate whether the terminal device can obtain the time information; and if the authorization information indicates that the terminal device can obtain the time information, send the first indication message to the terminal device; or if the authorization information indicates that the terminal device cannot obtain the time information, skip sending the first indication message to the terminal device.

According to a seventh aspect, an embodiment of this disclosure provides a terminal device. The terminal device includes: a transceiver module, configured to receive a first indication message sent by an access network device, where the first indication message includes time information of the terminal device, and a granularity of the time information is 1 us, 100 ns, or 1 ms; and a processing module, configured to synchronize time of the terminal device based on the time information.

According to an eighth aspect, an embodiment of this disclosure provides an access network device. The access network device includes: a processing module, configured to determine time information, where a granularity of the time information is 1 us, 100 ns, or 1 ms; and a transceiver module, configured to send a first indication message to a terminal device, where the first indication message includes the time information.

This disclosure further provides a time synchronization method. The method includes: receiving, by a terminal device, a first time sent by an access network device; obtaining, by the terminal device, a first transmission delay, and obtaining a fourth time based on the first transmission delay and the first time; and synchronizing, by the terminal device, time of the terminal device based on the fourth time.

In a possible design, the first time includes a second time and a third time; and the second time is a millisecond-level time, and the third time is a microsecond-level time or a nanosecond-level time.

In a possible design, the first time is obtained based on a sum of the second time and the third time.

In a possible design, the receiving, by a terminal device, a first time sent by an access network device includes: receiving, by the terminal device in a broadcast or unicast manner, the second time and the third time that are sent by the access network device.

In a possible design, before the receiving, by a terminal device, a first time sent by an access network device, the method further includes: sending, by the terminal device, a first message to the access network device, where the first message is used to request to synchronize the time of the terminal device, where the first message includes at least one of the following: a message for requesting the first time and a message for requesting the third time.

In a possible design, the first message includes at least one of the following: time accuracy information needed to be obtained by the terminal device, and a time type requested by the terminal device.

In a possible design, the first message is one of the following: an RRC message, a media access control control element (MAC CE) message, and a random access request message used for time synchronization.

In a possible design, the obtaining, by the terminal device, a fourth time based on the first transmission delay and the first time includes: obtaining, by the terminal device, the fourth time based on a sum of the first time and the first transmission delay.

In a possible design, the obtaining, by the terminal device, a first transmission delay includes: obtaining, by the terminal device, uplink timing advance information, and obtaining the first transmission delay based on the uplink timing advance information.

In a possible design, the obtaining, by the terminal device, uplink timing advance information includes: receiving, by the terminal device, a first message sent by the access network device, where the first message includes the uplink timing advance information; or receiving, by the terminal device, a second message sent by the access network device, where the second message includes uplink timing advance adjustment information; and updating, by the terminal device, current uplink timing advance information of the terminal device based on previous uplink timing advance information and the uplink timing advance adjustment information.

In a possible design, the first time or the fourth time represents a time of a boundary of a particular frame, subframe, slot, mini slot, or symbol.

An embodiment of this disclosure further provides a time synchronization method. The method includes: determining, by an access network device, a first time; and sending, by the access network device, the first time to a terminal device, where the first time is used to synchronize time of the terminal device.

In a possible design, the first time includes a second time and a third time; and the second time is a millisecond-level time, and the third time is a microsecond-level time and/or a nanosecond-level time.

In a possible design, the first time is obtained based on a sum of the second time and the third time.

In a possible design, the sending, by the access network device, the first time to a terminal device includes: sending, by the access network device, the second time and the third time to the terminal device in a broadcast or unicast manner.

In a possible design, before the sending, by the access network device, the first time to a terminal device, the method further includes: receiving, by the access network device, a first message sent by the terminal device, where the first message is used to request to synchronize the time of the terminal device, where the first message includes at least one of the following: a message for requesting the first time and a message for requesting the third time.

In a possible design, the first message includes at least one of the following: time accuracy information needed to be obtained by the terminal device, and a time type requested by the terminal device.

In a possible design, the first message is one of the following: an RRC message, a media access control control element (MAC CE) message, and a random access request message used for time synchronization.

In a possible design, the first time represents a time of a boundary of a particular frame, subframe, slot, mini slot, or symbol.

An embodiment of this disclosure further provides a terminal device. The terminal device includes: a transceiver module, configured to receive a first time sent by an access network device; and a processing module, configured to: obtain a first transmission delay, obtain a fourth time based on the first transmission delay and the first time, and synchronize time of the terminal device based on the fourth time.

In a possible design, the first time includes a second time and a third time; and the second time is a millisecond-level time, and the third time is a microsecond-level time and/or a nanosecond-level time.

In a possible design, the first time is obtained based on a sum of the second time and the third time.

In a possible design, the transceiver module is specifically configured to: receive in a broadcast or unicast manner, the second time and the third time that are sent by the access network device.

In a possible design, before receiving the first time sent by the access network device, the transceiver module is further configured to: send a first message to the access network device, where the first message is used to request to synchronize a time of the terminal device, where the first message includes at least one of the following: a message for requesting the first time and a message for requesting the third time.

In a possible design, the first message includes at least one of the following: time accuracy information needed to be obtained by the terminal device, and a time type requested by the terminal device.

In a possible design, the first message is one of the following: an RRC message, a media access control control element (MAC CE) message, and a random access request message used for time synchronization.

In a possible design, the processing module is specifically configured to: obtain the fourth time based on a sum of the first time and the first transmission delay.

In a possible design, the processing module is specifically configured to: obtain uplink timing advance information, and obtain the first transmission delay based on the uplink timing advance information.

In a possible design, the transceiver module is further configured to receive a first message sent by the access network device, where the first message includes the uplink timing advance information; or the transceiver module is further configured to receive a second message sent by the access network device, where the second message includes uplink timing advance adjustment information; and the processing module is specifically configured to update current uplink timing advance information of the terminal device based on previous uplink timing advance information and the uplink timing advance adjustment information.

In a possible design, the first time or the fourth time represents a time of a boundary of a particular frame, subframe, slot, mini slot, or symbol.

An embodiment of this disclosure further provides an access network device. The access network device includes: a processing module, configured to determine a first time; and a transceiver module, configured to send the first time to a terminal device, where the first time is used to synchronize time of the terminal device.

In a possible design, the first time includes a second time and a third time; and the second time is a millisecond-level time, and the third time is a microsecond-level time and/or a nanosecond-level time.

In a possible design, the first time is obtained based on a sum of the second time and the third time.

In a possible design, the transceiver module is specifically configured to: send the second time and the third time to the terminal device in a broadcast or unicast manner.

In a possible design, before sending the first time to the terminal device, the transceiver module is further configured to: receive a first message sent by the terminal device, where the first message is used to request to synchronize a time of the terminal device, where the first message includes at least one of the following: a message for requesting the first time and a message for requesting the third time.

In a possible design, the first message includes at least one of the following: time accuracy information needed to be obtained by the terminal device, and a time type requested by the terminal device.

In a possible design, the first message is one of the following: an RRC message, a media access control control element (MAC CE) message, and a random access request message used for time synchronization.

In a possible design, the first time represents a time of a boundary of a particular frame, subframe, slot, mini slot, or symbol.

According to a ninth aspect, an embodiment of this disclosure provides a communications apparatus. The communications apparatus may be a terminal device, and the communications apparatus has a function of implementing the method example in the first aspect or the third aspect. The communications apparatus includes a communications module and a processor.

The communications module is configured to perform communication interaction with another device, and the communications module may be an RF circuit, a Wi-Fi module, a communications interface, a Bluetooth module, or the like.

The processor is configured to implement a function of the processing module in the fifth aspect or the seventh aspect.

Optionally, the communications apparatus may further include a memory, configured to store a program and the like. Specifically, the program may include program code, and the program code includes an instruction. The memory may include a random access memory (RAM), or may include a non-volatile memory, for example, at least one magnetic disk memory. The processor executes the disclosure program stored in the memory to implement the foregoing functions.

In a possible manner, the communications module, the processor, and the memory may be connected to each other by using a bus. The bus may be a peripheral component interconnect (PCI) bus, an extended industry standard architecture (EISA) bus, or the like. The bus may be classified into an address bus, a data bus, a control bus, and the like.

According to a tenth aspect, an embodiment of this disclosure provides a communications apparatus. The communications apparatus may be an access network device, and the communications apparatus has a function of implementing the method example in the second aspect or the fourth aspect. The communications apparatus includes a communications module and a processor.

The communications module is configured to perform communication interaction with another device, and the communications module may be an RF circuit, a Wi-Fi module, a communications interface, a Bluetooth module, or the like.

The processor is configured to implement a function of the processing module in the sixth aspect or the eighth aspect.

Optionally, the communications apparatus may further include a memory, configured to store a program and the like. Specifically, the program may include program code, and the program code includes an instruction. The memory may include a RAM, or may include a non-volatile memory, for example, at least one magnetic disk memory. The processor executes an application program stored in the memory to implement the foregoing functions.

In a possible manner, the communications module, the processor, and the memory may be connected to each other by using a bus. The bus may be a PCI bus, an EISA bus, or the like. The bus may be classified into an address bus, a data bus, a control bus, and the like.

According to an eleventh aspect, an embodiment of this disclosure provides a time synchronization method. The method includes: receiving, by a terminal device, a first value sent by an access network device, where the first value is used to indicate a first time; and obtaining, by the terminal device, the first time based on the first value, where a time unit of the first time is n microseconds, n nanoseconds, n femtoseconds, or n milliseconds, and n is greater than 0; and when the time unit is n milliseconds, n is less than 10.

In a possible design, the obtaining, by the terminal device, the first time based on the first value includes: receiving, by the terminal device, first indication information sent by the access network device by a system message, a unicast message, or a multicast message, where the first indication information is used to indicate the time unit of the first time; and obtaining, by the terminal device, the first time based on a product of the first value and the time unit of the first time.

In a possible design, the time unit of the first time is a preset time unit; and the obtaining, by the terminal device, the first time based on the first value includes: obtaining, by the terminal device, the first time based on a product of the first value and the preset time unit.

In a possible design, after the obtaining, by the terminal device, the first time based on the first value, the method further includes: receiving, by the terminal device in a broadcast, unicast, or multicast manner, a second time sent by the access network device, where a time unit of the second time is 10 milliseconds; and obtaining, by the terminal device, a third time by adding the first time and the second time.

In a possible design, the method further includes: obtaining, by the terminal device, a fifth time based on a sum of the first time and a preset time, and synchronizing a time of the terminal device based on the fifth time.

In a possible design, the receiving, by a terminal device, a first value sent by an access network device includes: receiving, by the terminal device, a unicast message sent by the access network device, where the unicast message includes the first value.

In a possible design, the unicast message further includes a frame number of a first system frame; and after the receiving, by the terminal device, a unicast message sent by the access network device, the method further includes: obtaining, by the terminal device based on the frame number of the first system frame and a frame number of a second system frame, a first system frame corresponding to the fifth time, where the second system frame is a system frame of the first value.

In a possible design, the fifth time corresponds to a frame header boundary or a frame trailer boundary of the first system frame; and the first system frame is a system frame that is closest to the second system frame and whose frame number is equal to the frame number of the first system frame; or the first system frame is a system frame that is located before the second system frame, that is closest to the second system frame, and whose frame number is equal to the frame number of the first system frame; or the first system frame is a system frame that is located after the second system frame, that is closest to the second system frame, and whose frame number is equal to the frame number of the first system frame; or when the frame number of the first system frame is the same as the frame number of the second system frame, the first system frame is the second system frame.

In a possible design, the receiving, by a terminal device, a first value sent by an access network device includes: receiving, by the terminal device, a first system information block sent by a network device, where the first system information block includes the first value.

In a possible design, the first value includes values of a plurality of parameters, and the plurality of parameters correspond to different time units; and the obtaining, by the terminal device, the first time based on the first value includes: obtaining, by the terminal device, the first time based on the values of the plurality of parameters included in the first value.

In a possible design, the method further includes: sending, by the terminal device, a first message to the access network device, where the first message is used to request the access network device to send the first value to the terminal device.

According to a twelfth aspect, an embodiment of this disclosure provides a time synchronization method. The method includes: determining, by an access network device, a first value, where the first value is used to indicate a first time, a time unit of the first time is n microseconds, n nanoseconds, n femtoseconds, or n milliseconds, and n is greater than 0; and when the time unit is n milliseconds, n is less than 10; and sending, by the access network device, the first value to a terminal device.

In a possible design, the method further includes: sending, by the access network device, first indication information to the terminal device by a system message, a unicast message, or a multicast message, where the first indication information is used to indicate the time unit of the first time, where the first time is obtained by the terminal device based on a product of the first value and the time unit of the first time.

In a possible design, the time unit of the first time is a preset time unit, and the first time is obtained by the terminal device based on a product of the first value and the preset time unit.

In a possible design, the access network device sends a second time to the terminal device in a broadcast, unicast, or multicast manner, where a time unit of the second time is 10 milliseconds; and a third time is obtained by the terminal device by adding the first time and the second time.

In a possible design, the sending, by the access network device, the first value to a terminal device includes: sending, by the access network device, a unicast message to the terminal device, where the unicast message includes the first value.

In a possible design, the unicast message further includes a frame number of a first system frame; and a first system frame corresponding to a fifth time is obtained by the terminal device based on the frame number of the first system frame and a frame number of a second system frame, and the second system frame is a system frame in which the terminal device receives the first value.

In a possible design, the fifth time corresponds to a frame header boundary or a frame trailer boundary of the first system frame; and the first system frame is a system frame that is closest to the second system frame and whose frame number is equal to the frame number of the first system frame; or the first system frame is a system frame that is located before the second system frame, that is closest to the second system frame, and whose frame number is equal to the frame number of the first system frame; or the first system frame is a system frame that is located after the second system frame, that is closest to the second system frame, and whose frame number is equal to the frame number of the first system frame; or when the frame number of the first system frame is the same as the frame number of the second system frame, the first system frame is the second system frame.

In a possible design, the sending, by the access network device, the first value to a terminal device includes: sending, by the access network device, a first system information block to the terminal device, where the first system information block includes the first value.

In a possible design, the first value includes values of a plurality of parameters, and the plurality of parameters correspond to different time units; and the first time is obtained by the terminal device based on the values of the plurality of parameters.

In a possible design, the method further includes: receiving, by the access network device, a first message sent by the terminal device, where the first message is used to request the access network device to send the first value to the terminal device.

According to a thirteenth aspect, an embodiment of this disclosure provides a terminal device. The terminal device has a function of implementing the terminal device in the eleventh aspect, and the terminal device includes one or more modules corresponding to the foregoing function.

In a possible design, the terminal device includes a processing module and a transceiver module.

The transceiver module is configured to receive a first value sent by an access network device, where the first value is used to indicate a first time.

The processing module is configured to obtain the first time based on the first value, where a time unit of the first time is n microseconds, n nanoseconds, n femtoseconds, or n milliseconds, and n is greater than 0; and when the time unit is n milliseconds, n is less than 10.

In a possible design, the transceiver module is further configured to receive first indication information sent by the access network device by using a system message, a unicast message, or a multicast message, where the first indication information is used to indicate the time unit of the first time; and the processing module is specifically configured to obtain the first time based on a product of the first value and the time unit of the first time.

In a possible design, the time unit of the first time is a preset time unit; and the processing module is specifically configured to obtain the first time based on a product of the first value and the preset time unit.

In a possible design, the transceiver module is further configured to receive, in a broadcast, unicast, or multicast manner, a second time sent by the access network device, where a time unit of the second time is 10 milliseconds; and the processing module is specifically configured to obtain a third time by adding the first time and the second time.

In a possible design, the processing module is further configured to: obtain a fifth time based on a sum of the first time and a preset time, and synchronize a time of the terminal device based on the fifth time.

In a possible design, the transceiver module is specifically configured to receive a unicast message sent by the access network device, where the unicast message includes the first value.

In a possible design, the unicast message further includes a frame number of a first system frame; and the processing module is further configured to obtain, based on the frame number of the first system frame and a frame number of a second system frame, a first system frame corresponding to the fifth time, where the second system frame is a system frame of the first value.

In a possible design, the fifth time corresponds to a frame header boundary or a frame trailer boundary of the first system frame; and the first system frame is a system frame that is closest to the second system frame and whose frame number is equal to the frame number of the first system frame; or the first system frame is a system frame that is located before the second system frame, that is closest to the second system frame, and whose frame number is equal to the frame number of the first system frame; or the first system frame is a system frame that is located after the second system frame, that is closest to the second system frame, and whose frame number is equal to the frame number of the first system frame; or when the frame number of the first system frame is the same as the frame number of the second system frame, the first system frame is the second system frame.

In a possible design, the transceiver module is specifically configured to receive a first system information block sent by a network device, where the first system information block includes the first value.

In a possible design, the first value includes values of a plurality of parameters, and the plurality of parameters correspond to different time units; and the processing module is specifically configured to obtain the first time based on the values of the plurality of parameters included in the first value.

In a possible design, the transceiver module is further configured to send a first message to the access network device, where the first message is used to request the access network device to send the first value to the terminal device.

According to a fourteenth aspect, an embodiment of this disclosure provides an access network device. The access network device has a function of implementing the access network device in the twelfth aspect, and the access network device includes one or more modules corresponding to the foregoing function.

In a possible design, the access network device includes a processing module and a transceiver module.

The processing module is configured to determine a first value, where the first value is used to indicate a first time, a time unit of the first time is n microseconds, n nanoseconds, n femtoseconds, or n milliseconds, and n is greater than 0; and when the time unit is n milliseconds, n is less than 10.

The transceiver module is configured to send the first value to a terminal device.

In a possible design, the transceiver module is further configured to send first indication information to the terminal device by using a system message, a unicast message, or a multicast message, where the first indication information is used to indicate the time unit of the first time; and the first time is obtained by the terminal device based on a product of the first value and the time unit of the first time.

In a possible design, the time unit of the first time is a preset time unit, and the first time is obtained by the terminal device based on a product of the first value and the preset time unit.

In a possible design, the transceiver unit is further configured to send a second time to the terminal device in a broadcast, unicast, or multicast manner, where a time unit of the second time is 10 milliseconds; and a third time is obtained by the terminal device by adding the first time and the second time.

In a possible design, the transceiver module is specifically configured to send a unicast message to the terminal device, where the unicast message includes the first value.

In a possible design, the unicast message further includes a frame number of a first system frame; and a first system frame corresponding to a fifth time is obtained by the terminal device based on the frame number of the first system frame and a frame number of a second system frame, and the second system frame is a system frame in which the terminal device receives the first value.

In a possible design, the fifth time corresponds to a frame header boundary or a frame trailer boundary of the first system frame; and the first system frame is a system frame that is closest to the second system frame and whose frame number is equal to the frame number of the first system frame; or the first system frame is a system frame that is located before the second system frame, that is closest to the second system frame, and whose frame number is equal to the frame number of the first system frame; or the first system frame is a system frame that is located after the second system frame, that is closest to the second system frame, and whose frame number is equal to the frame number of the first system frame; or when the frame number of the first system frame is the same as the frame number of the second system frame, the first system frame is the second system frame.

In a possible design, the transceiver module is specifically configured to send a first system information block to the terminal device, where the first system information block includes the first value.

In a possible design, the first value includes values of a plurality of parameters, and the plurality of parameters correspond to different time units; and the first time is obtained by the terminal device based on the values of the plurality of the parameters.

In a possible design, the transceiver module is further configured to receive a first message sent by the terminal device, where the first message is used to request the access network device to send the first value to the terminal device.

According to a fifteenth aspect, an embodiment of this disclosure provides a communications apparatus. The communications apparatus may be a terminal device, and the communications apparatus has a function of implementing the method example in the eleventh aspect. The communications apparatus includes a communications module and a processor.

The communications module is configured to perform communication interaction with another device, and the communications module may be an RF circuit, a Wi-Fi module, a communications interface, a Bluetooth module, or the like.

The processor is configured to implement a function of the processing module in the thirteenth aspect.

Optionally, the communications apparatus may further include a memory, configured to store a program and the like. Specifically, the program may include program code, and the program code includes an instruction. The memory may include a random access memory (RAM), or may include a non-volatile memory, for example, at least one magnetic disk memory. The processor executes the disclosure program stored in the memory to implement the foregoing functions.

In a possible manner, the communications module, the processor, and the memory may be connected to each other by using a bus. The bus may be a peripheral component interconnect (PCI) bus, an extended industry standard architecture (EISA) bus, or the like. The bus may be classified into an address bus, a data bus, a control bus, and the like.

According to a sixteenth aspect, an embodiment of this disclosure provides a communications apparatus. The communications apparatus may be an access network device, and the communications apparatus has a function of implementing the method example in the twelfth aspect. The communications apparatus includes a communications module and a processor.

The communications module is configured to perform communication interaction with another device, and the communications module may be an RF circuit, a Wi-Fi module, a communications interface, a Bluetooth module, or the like.

The processor is configured to implement a function of the processing module in the fourteenth aspect.

Optionally, the communications apparatus may further include a memory, configured to store a program and the like. Specifically, the program may include program code, and the program code includes an instruction. The memory may include a RAM, or may include a non-volatile memory, for example, at least one magnetic disk memory. The processor executes an disclosure program stored in the memory to implement the foregoing functions.

In a possible manner, the communications module, the processor, and the memory may be connected to each other by using a bus. The bus may be a PCI bus, an EISA bus, or the like. The bus may be classified into an address bus, a data bus, a control bus, and the like.

An embodiment of this disclosure further provides a computer-readable storage medium. The storage medium stores an instruction, and when the instruction is run on a computer, the computer is enabled to perform the time synchronization method provided in any one of the foregoing designs.

An embodiment of this disclosure further provides a computer program product including an instruction. When the computer program product runs on a computer, the computer is enabled to perform the time synchronization method provided in any one of the foregoing designs.

An embodiment of this disclosure further provides a computer program. When the computer program is run on a computer, the computer is enabled to perform the time synchronization method provided in any one of the foregoing designs.

An embodiment of this disclosure further provides a chip. The chip is connected to a memory, and is configured to read and execute a software program stored in the memory to perform the time synchronization method provided in any one of the foregoing designs.

BRIEF DESCRIPTION OF THE DRAWINGS

FIG. 11c is a schematic diagram of time information that does not carry year, month, and day;

FIG. 12b is a schematic diagram of an extended SIB 16;

FIG. 12C is a schematic diagram showing that a time unit of a first time is a time unit having some constant lengths;

FIG. 12d is a schematic diagram of a first value indicated in an explicit manner;

FIG. 12e is a schematic diagram of a first value indicated in another explicit manner;

DETAILED DESCRIPTION OF ILLUSTRATIVE EMBODIMENTS

The following further illustrates the embodiments of this disclosure in detail with reference to the accompanying drawings of this specification.

Figure 1:
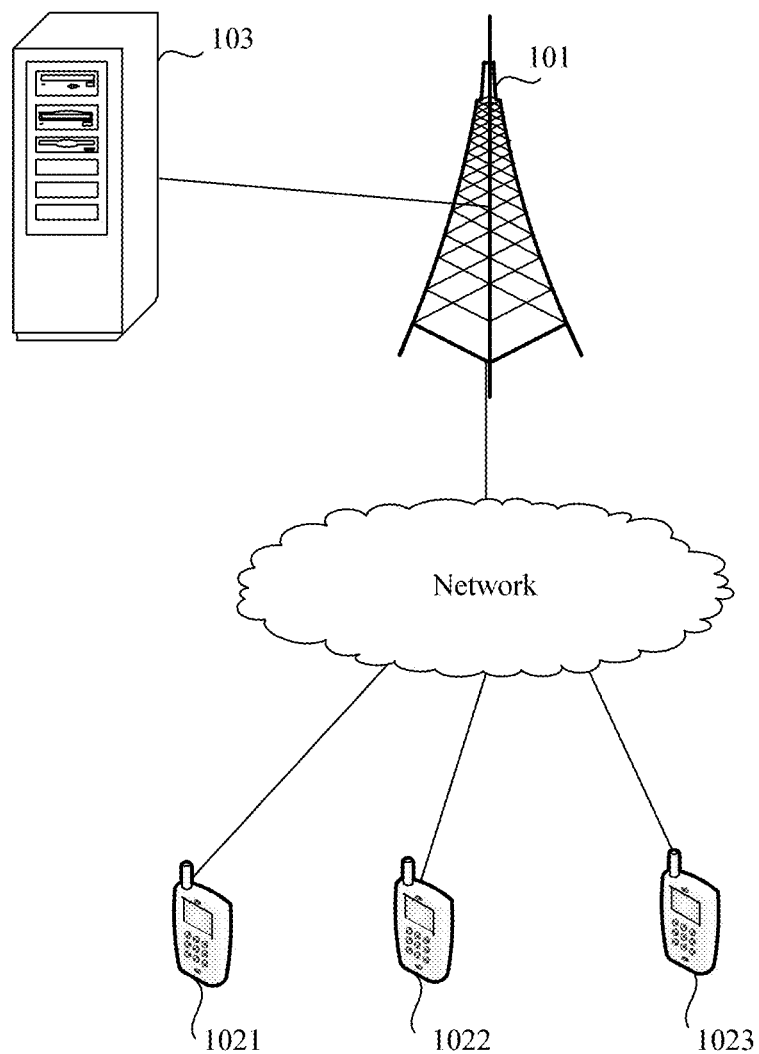
FIG. 1 is a schematic diagram of a system architecture to which an embodiment of this disclosure is applicable.

FIG. 1 is a schematic diagram of a system architecture to which an embodiment of this disclosure is applicable. As shown in FIG. 1, the system architecture includes an access network device 101, a core network device 103, and one or more terminal devices, for example, a terminal device 1021, a terminal device 1022, and a terminal device 1023 shown in FIG. 1. Information may be transmitted between the access network device 101 and the core network device 103. The access network device 101 may transmit downlink data to the terminal device 1021, the terminal device 1022, and the terminal device 1023 by using a network; and the terminal device 1021, the terminal device 1022, and the terminal device 1023 may transmit uplink data to the access network device 101 by using a network.

In this embodiment of this disclosure, the access network device may be a base station (BS) device. The base station device may also be referred to as a base station, and is an apparatus deployed in a radio access network to provide a wireless communication function. For example, a device that provides a base station function in a 2G network includes a base transceiver station (BTS) and a base station controller (BSC); a device that provides a base station function in a 3G network includes a NodeB and a radio network controller (RNC); a device that provides a base station function in a 4G network includes an evolved NodeB (eNB); and a device that provides a base station function in a 5G network includes a new radio NodeB (gNB), a centralized unit (CU), a distributed unit, and a new radio controller.

The core network device 103 may be a mobility management entity (MME) in an LTE system, or an access and mobility management function (AMF) network element and a session management function (SMF) network element in a 5G communications system. This is not specifically limited.

The terminal device is a device having a wireless transceiver function, and may be deployed on land, including an indoor device, an outdoor device, a handheld device, or a vehicle-mounted device; or may be deployed on a water surface (such as a ship); or may be deployed in the air (for example, on an aircraft, a balloon, or a satellite). The terminal device may be a mobile phone, a tablet computer (Pad), a computer with a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in a smart grid, a wireless terminal device in transportation safety, a wireless terminal device in a smart city, a wireless terminal device in a smart home, or the like.

In this embodiment of this disclosure, the system architecture shown in FIG. 1 is mainly used as an example for description, but this disclosure is not limited thereto.

A communications system to which the foregoing system architecture is applicable includes but is not limited to: time division duplexing-long term evolution (TDD LTE), frequency division duplexing-long term evolution (FDD LTE), long term evolution-advanced (LTE-A), and various future evolved wireless communications systems (for example, a 5G NR system).

In the prior art, an access network device broadcasts time information by using a system information block (SIB). The time information includes information such as universal time coordinated (UTC). A terminal device calculates a global positioning system (GPS) time and local time based on the obtained time information. However, because there is a time error of air interface transmission between the access network device and the terminal device, time synchronization is not accurate enough.

Based on this, an embodiment of this disclosure provides a time synchronization method. The method includes: receiving, by a terminal device, a first indication message sent by an access network device, where the first indication message includes time information; obtaining a first transmission delay; obtaining a fourth time based on the first transmission delay and the time information; and synchronizing time of the terminal device based on the fourth time. In this way, when the terminal device synchronizes a time of the terminal device, the first transmission delay is introduced, so that a time error of air interface transmission can be effectively avoided, and accuracy of time synchronization can be improved. In addition, the time synchronization method has relatively strong applicability, and may be applicable to terminal devices in different states, for example, an idle state, a connected state, and a deactivated state.

It should be noted that time synchronization in this embodiment of this disclosure may also be referred to as clock synchronization.

The following describes the foregoing time synchronization method with reference to specific embodiments (Embodiment 1 to Embodiment 7).

Embodiment 1

Figure 2:
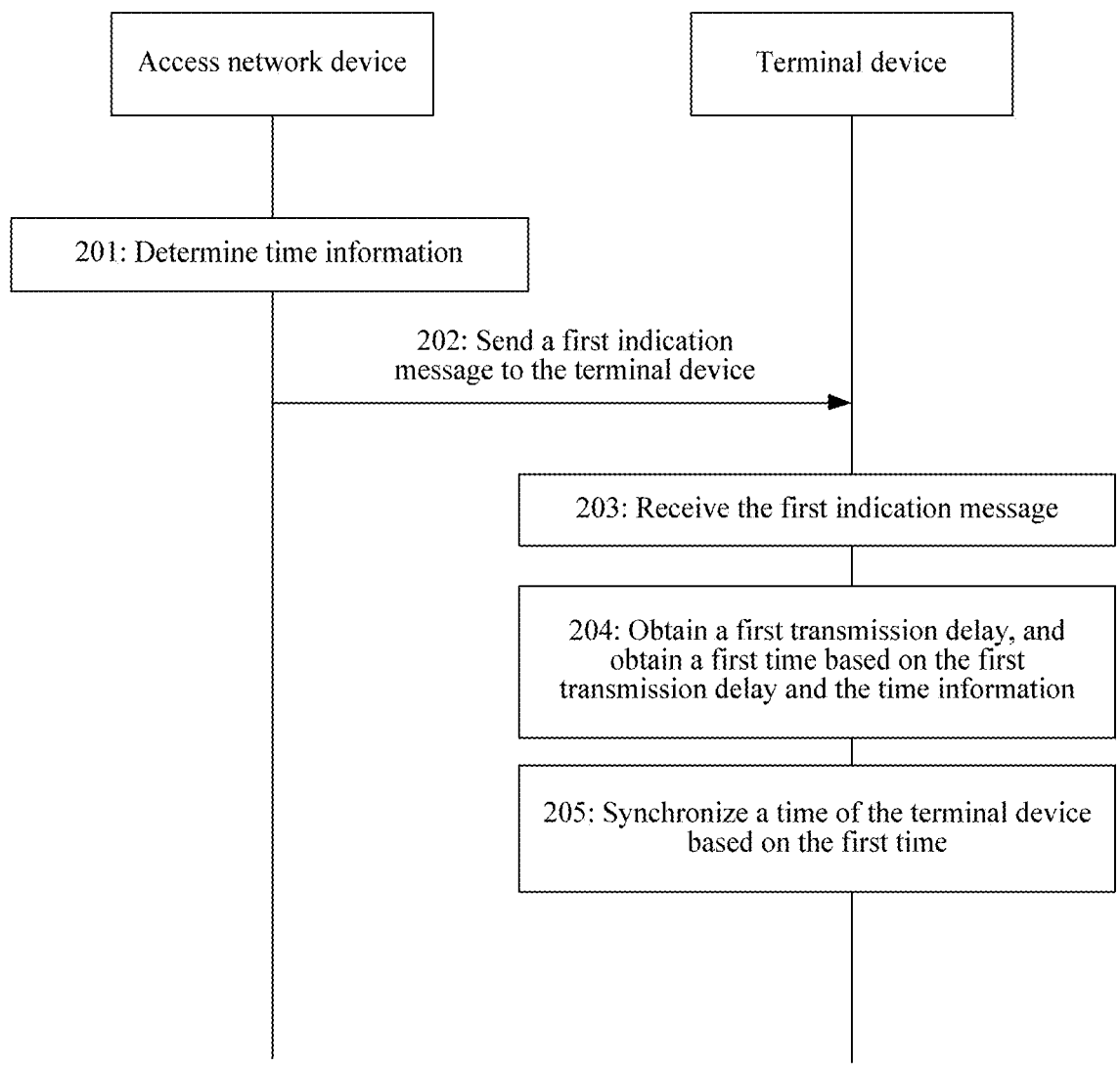
FIG. 2 is a schematic flowchart corresponding to a time synchronization method according to Embodiment 1 of this disclosure.

FIG. 2 is a schematic flowchart corresponding to a time synchronization method according to Embodiment 1 of this disclosure. As shown in FIG. 2, the method includes the following steps.

Step 201: An access network device determines time information.

Herein, the time information may include a time of a first time type, for example, XX:XX:XX:XX, which is accurate to microsecond, or XX:XX:XX:XX:XX, which is accurate to nanosecond. The first time type may correspond to UTC.

Further, the time information may include a time difference between the first time type and another time type (a GPS time or a local time), for example, a time difference between the UTC and the GPS time, or a time difference between the UTC and the local time.

In this embodiment of this disclosure, a time unit used for the time information may be any time unit whose accuracy is higher than or equal to millisecond (ms), for example, microsecond (us), nanosecond (ns), or a time unit that may be more accurate in the future. When any time unit is used for the time information, a granularity value of the time information may be flexibly set. For example, when the time unit used for the time information is nanosecond, the granularity value of the time information may be any value greater than or equal to 1. For example, if the granularity value of the time information is 50, the granularity of the time information is 50 ns. For another example, when the granularity value of the time information is 100, the granularity of the time information is 100 ns. For still another example, when the time unit used for the time information is microsecond, the granularity value of the time information may be any value greater than or equal to 1. For example, if the granularity value of the time information is 1, the granularity of the time information is 1 us. For another example, if the granularity value of the time information is 10, the granularity of the time information is 10 us.

It can be learned that the granularity of the time information may be 1 μs, 10 μs, 50 ns, 100 ns, or 1 ms. This is merely an example based on the foregoing description, and is not specifically limited. A granularity of time information that includes another value and time unit that meet the foregoing description falls within the protection scope of this disclosure.

Step 202: The access network device sends a first indication message to a terminal device, where the first indication message includes the time information, and the time information is used to synchronize time of the terminal device.

Herein, the first indication message may further include at least one of the following: a time information reference point and a time type.

The time type corresponds to at least any one of the UTC time, the GPS time, and the local time, and is used to indicate a time type of the time information.

The time information reference point is used to indicate a time domain location corresponding to a first time or a fourth time received by the terminal device. The time information reference point may be a start boundary or an end boundary of a scheduling unit such as a frame, a subframe, a slot, a mini slot, or a symbol, and corresponds to a frame, subframe, slot, mini-slot, or symbol in which the terminal device needs to synchronize a time of the terminal device.

Specifically, the time information reference point may be a boundary of a specific frame number, a specific subframe number, a specific slot in a specific subframe, or a specific symbol in a specific subframe (where the boundary includes a start boundary and an end boundary); or a boundary of a specific frame number, a specific subframe number, a specific slot in a subframe, or a specific symbol in a subframe that is closest to a moment at which a message is received (where the boundary includes a start boundary and an end boundary).

In addition, when the system message is used to indicate the time information, the time information reference point may further correspond to a frame trailer boundary or a frame start boundary of a frame in which a system message window in which a system message is located.

When a downlink unicast message is used to indicate the time information, the time information reference point corresponds to a frame trailer boundary or a frame start boundary of a frame in which the downlink unicast message is successfully received.

When a downlink unicast message is used to indicate the time information, the time information reference point corresponds to a frame trailer boundary or a frame start boundary of a frame in which an uplink request message corresponding to the downlink unicast message is successfully received.

When a downlink unicast message is used to indicate the time information, the time information reference point corresponds to a frame trailer boundary or a frame start boundary of a frame in which the downlink unicast message is initially transmitted.

When a downlink unicast message is used to indicate the time information, the time information reference point corresponds to a frame trailer boundary or a frame start boundary of a frame in which an uplink request message is initially transmitted.

When a downlink unicast message is used to indicate the time information, the time information reference point corresponds to a frame trailer boundary or a frame start boundary of a frame in which the downlink unicast message is retransmitted for an $n^{th}$ time, where n is a positive integer.

When a downlink unicast message is used to indicate the time information, the time information reference point corresponds to a frame trailer boundary or a frame start boundary of a frame in which an uplink request message corresponding to the downlink unicast message is retransmitted for an $n^{th}$ time, where n is a positive integer. A granularity of the time information reference point may be the same as or different from a granularity of the time information. For example, the granularity of the time information reference point may be greater than the granularity of the time information. For example, the granularity of the time information reference point is a subframe granularity, which may be understood as a granularity of a ms level, and the granularity of the time information may be a granularity of a microsecond level.

It should be noted that the time information reference point may be specified in advance in a protocol. In this case, the first indication message may not carry the time information reference point. Alternatively, the time information reference point may be dynamic, and may be determined by the access network device. In this case, the first indication message may carry the time information reference point, to notify the terminal device of a time point at which the terminal device synchronizes a time of the terminal device. In another possible implementation, the access network device may alternatively send the time information reference point by using a message other than the first indication message. In other words, the first indication message does not carry the time information reference point, and the time information reference point is carried in another message.

In this embodiment of this disclosure, when determining the time information reference point, the access network device may use a time at which the time information is carried as a reference point, or use a time of a previous message as the reference point.

In this embodiment of this disclosure, there may be a plurality of trigger conditions for sending the time information by the access network device to the terminal device by using the first indication message. For example, the access network device may determine the time information based on a request message sent by the terminal device, and send the time information to the terminal device, that is, the sending of the time information is triggered by the request message. In this case, time synchronization can be performed as required, to avoid a waste of resources. Alternatively, the sending of the time information may be triggered by another condition. In an example, the access network device determines the time information based on a specified period and sends the time information to the terminal device. In other words, the sending is triggered periodically. This is not specifically limited.

The access network device may determine the time information in a plurality of manners. The following specifically describes several possible implementations.

Manner 1:

The access network device receives the request message sent by the terminal device, where the request message may include at least one of the following: demand information of the time information, granularity demand information of the time information, quality of service (QoS) information of a service supported by the terminal device, and a time type requested by the terminal device. Further, the access network device determines the time information based on the request message.

The demand information of the time information is used to indicate that the terminal device needs to obtain the time information, or is used to indicate that the access network device needs to send the time information to the terminal device. The demand information of the time information may be specifically content in a plurality of forms. This is not limited in this disclosure.

The granularity demand information of the time information is used to indicate a granularity of time information required by the terminal device, for example, may be 1 μs, 100 ns, or 1 ms. In this way, after obtaining the granularity demand information of the time information, the access network device may determine the granularity of the time information based thereupon.

The QoS information of the service supported by the terminal device is used to indicate the granularity of the time information required by the terminal device. In an example, the QoS information may directly include granularity demand information required by the service. For example, the granularity demand information may be 1 μs, 100 ns, or 1 ms. In this way, after obtaining the QoS information of the service supported by the terminal device, the access network device may determine the granularity of the time information based thereupon. In another possible implementation, the QoS information may not directly include the granularity demand information required by the service. In this case, the access network device may infer, based on the received QoS information, the granularity demand information required by the service, and determine the granularity of the time information based on the inferred granularity demand information.

The time type requested by the terminal device corresponds to at least any one of the UTC, the GPS time, and the local time. In this way, after obtaining the time type requested by the terminal device, the access network device may determine the time type of the time information based thereupon. In a first example, if the time type requested by the terminal device corresponds to the UTC time and the GPS time, the access network device may determine that the time information includes the UTC time and a time difference between the UTC time and the GPS time. In a second example, if the time type requested by the terminal device corresponds to the UTC and the local time, the access network device may determine that the time information includes the UTC time and a time difference between the UTC and the local time.

It should be noted that the three time types, namely, the UTC, the GPS time, and the local time, are merely used as examples. In another embodiment, there may also be a time type other than the foregoing three time types. In this case, the time type requested by the terminal device may further correspond to another time type. This is not limited in this disclosure. In this disclosure, different information element (IE) combinations correspond to different time types. For example, an IE 0 corresponds to the UTC, the IE 0 and an IE 1 correspond to the GPS time, and the IE 0 and an IE 2 correspond to the local time. In an example, the time type requested by the terminal device may be specifically an identifier of an IE combination. In this way, the access network device may determine, based on the identifier of the IE combination, the time type corresponding to the identifier of the IE combination, to learn of the time type requested by the terminal device.

Further, the request message may be a radio resource control (RRC) message, a media access control control element (MAC CE) message, or a random access request message. The RRC message may include an RRC connection release message or another message. This is not specifically limited.

Manner 2:

The access network device may obtain first indication information from a core network device, where the first indication information includes the granularity demand information of the time information and/or the QoS information of the service supported by the terminal device. Further, the access network device determines the time information based on the first indication information. For the granularity demand information of the time information and the QoS information of the service supported by the terminal device, refer to the description in the manner 1. Details are not described herein again.

Manner 3:

Related content (such as the granularity and the time type) of the time information may alternatively be agreed on in advance by using a protocol, or may be determined through negotiation between the access network device and the terminal device in advance. For example, it is agreed in advance that the granularity of the time information is 1 us, 100 ns, or 1 ms, and/or the time type of the time information includes the UTC time, the GPS time, and the local time, that is, the time information needs to include the UTC time, the time difference between the UTC time and the GPS time, and the time difference between the UTC time and the local time.

It can be learned from the foregoing content that a possible manner for determining the time information is: (1) determining the time information based on the request message; (2) determining the time information based on the first indication information; and (3) determining the time information as pre-agreed. In this embodiment of this disclosure, the three manners may be used separately, or may be used in combination.

Specifically, if the access network device receives the request message sent by the terminal device, because the request message includes at least one of the foregoing items, in an example 1, the request message includes only the demand information of the time information and the time type requested by the terminal device, the access network device may determine the time type of the time information based on the time type requested by the terminal device, and determine the granularity of the time information based on the first indication information, or may determine the granularity of the time information based on the pre-agreed granularity. In an example 2, if the request message includes only the demand information of the time information, the access network device may determine the time type of the time information based on the pre-agreed time type, and determine the granularity of the time information based on the first indication information, or may determine the granularity of the time information based on the pre-agreed granularity.

If the access network device does not receive the request message (for example, the periodic triggering described above) sent by the terminal device, the access network device may determine the granularity and the time type of the time information only based on related content of the pre-agreed time information, or may determine the granularity of the time information based on the first indication information, and determine the time type of the time information based on the related content of the pre-agreed time information.

According to the foregoing content description, for an example of content included in the first indication message, refer to Table 1.

TABLE 1

Example of the content included in the first indication message

| Time information reference point | ********* | | |
|---|---|---|---|
| Time type | UTC | GPS time | Local time |
| Time information | XX:XX:XX:XX | Time difference between the UTC time and the GPS time | Time difference between the UTC time and the local time |

Content in Table 1 is merely a possible example. During specific implementation, addition or deletion may be performed based on Table 1. In this embodiment of this disclosure, the access network device may send the first indication message to the terminal device in a broadcast, unicast, or multicast manner. This is not specifically limited. Correspondingly, the terminal device may receive, in a broadcast, unicast, or multicast manner, the first indication message sent by the access network device.

The first indication message may be a system message, an RRC message, or a MAC CE message.

Further, the access network device may receive authorization information sent by the core network device, where the authorization information is used to indicate whether the terminal device can obtain the time information. If the authorization information indicates that the terminal device can obtain the time information, the access network device sends the first indication message to the terminal device; or if the authorization information indicates that the terminal device cannot obtain the time information, the access network device may not send the first indication message to the terminal device.

Specifically, in a process in which the terminal device establishes a connection to a network, the core network device may authorize the terminal device to use a precise timing service, and send the authorization information to the access network device. In this way, the access network device may send the first indication message to the terminal device. If the terminal device is not authorized, the access network device may not send the first indication message, or may not respond to the request message sent by the terminal device. By using this solution, the time information may be sent only to the terminal that is authorized with the precise timing service, to differently treat an authorized terminal and an unauthorized terminal, so that an operator obtains a commercial profit by authorizing the precise timing service.

Step 203: The terminal device receives the first indication message sent by the access network device.

Step 204: The terminal device obtains a first transmission delay, and obtains a fourth time based on the first transmission delay and the time information.

In this embodiment of this disclosure, the first transmission delay may be a downlink unidirectional transmission delay, or the first transmission delay may be obtained by comprehensively considering a downlink unidirectional transmission delay and processing delays of the terminal device and/or the access network device.

The processing delays of the terminal device and the access network device may be agreed on in advance in a protocol, or may be determined by the access network device and sent to the terminal device. This is not specifically limited.

The terminal device may obtain the downlink unidirectional transmission delay in a plurality of manners. For example, the terminal device obtains uplink timing advance (TA) information, and obtains the downlink unidirectional transmission delay based on the uplink timing advance information.

Specifically, a possible implementation of obtaining the uplink timing advance information by the terminal device is that the terminal device receives a second indication message sent by the access network device, where the second indication message includes the uplink timing advance information. For example, in a random access process, the terminal device receives a random access response (RAR) (namely, the second indication message) sent by the access network device, where the random access response includes the uplink timing advance information. Specifically, after triggering random access, the terminal device selects a preamble and a physical resource (namely, a physical random access channel (PRACH)) resource that is used to send the preamble, and then sends the preamble (the random access request) on the PRACH. After receiving the random access request, the access network device allocates a corresponding RAR, and adds the uplink timing advance information to the RAR. The terminal device may periodically trigger random access to obtain the uplink timing advance information, or may maintain validity of the downlink unidirectional transmission delay by using a timer. If the timer expires, the terminal device re-initiates random access to obtain the uplink timing advance information, or may trigger random access by using another specific event or command to obtain the uplink timing advance information. This is not specifically limited.

It should be noted that a physical resource used to send the preamble may be the PRACH in the foregoing description, or may have another name, for example, may be referred to as an NR-PRACH in a 5G communications system.

In this embodiment of this disclosure, the terminal device may add indication information to a random access request, to indicate that the terminal device has completed the current random access procedure after the RAR is sent. In other words, the random access request is a random access request for a timing purpose, or the terminal device no longer continues to initiate a subsequent RRC process. By adding the indication information, the access network device may distinguish the random access request from a conventional random access request, and perform a corresponding operation, for example, may release a resource allocated to the random access process, for example, a radio network temporary identifier (RNTI). Alternatively, the access network device does not need to wait for a subsequent message.

In another possible implementation, the terminal device receives a third indication message sent by the access network device, where the third indication message includes uplink timing advance adjustment information; and the terminal device obtains the uplink timing advance information based on previous uplink timing advance information and the uplink timing advance adjustment information. For example, in a non-random access process, the terminal device may obtain the uplink timing advance information of the terminal device based on a received TA adjustment command (namely, the third indication message) sent by the access network device. In other words, the terminal device updates the previous uplink timing advance information based on the uplink timing advance adjustment information in the TA adjustment command, to obtain an uplink timing advance of the terminal device. Refer to the following formula:

$$N_{TA,new} = N_{TA,old} + T \quad \text{Formula 1}$$

where $N_{TA,new}$ is a current uplink timing advance of the terminal device, $N_{TA,old}$ is a previous uplink timing advance, T is obtained based on the uplink timing advance adjustment information, and $N_{TA,new}$ may be specifically a functional formula about $N_{TA,old}$.

In an example, the current uplink timing advance information of the terminal device may be obtained by using the following formula:

$$N_{TA,new} = N_{TA,old} + (N_{TA,old} - 31)*16 \quad \text{Formula 2}$$

where $(N_{TA,old} - 31)*16$ is obtained based on the uplink timing advance adjustment information in the TA adjustment command.

In still another possible implementation, if the terminal device is in an idle state or a deactivated (or an inactive) state, the terminal device may obtain the uplink timing advance information based on a stored last TA in a connected state, or may obtain, based on a TA allocated by the access network device to the terminal device when an RRC connection is released, the uplink timing advance information.

The deactivated state may also be referred to as an inactive state, and is between an idle state and a connected state. In this state, the access network device maintains a connection to a core network, that is, stores a context of the terminal device, but releases the connection between the access network device and the terminal device. In this way, a delay caused by re-obtaining the context of the terminal device when the terminal device needs to enter the connected mode is avoided.

A possible implementation of obtaining the downlink unidirectional transmission delay by the terminal device based on the uplink timing advance information is that the terminal device uses half of the TA in the uplink timing advance information as the downlink unidirectional transmission delay, or may obtain the downlink unidirectional transmission delay based on the TA in the uplink timing advance information by using another function. This is not specifically limited.

Step 205: The terminal device synchronizes a time of the terminal device based on the fourth time.

In this embodiment of this disclosure, the foregoing step numbers are merely an example representation of an execution process, and do not constitute a specific limitation on an execution sequence.

Specifically, after obtaining the first transmission delay in the foregoing manner, the terminal device may obtain the fourth time based on the first transmission delay and the time information in a plurality of specific manners. For example, if the time information includes the UTC time, the terminal device may add the first transmission delay and the UTC time, to obtain the fourth time (Ti), and further update the UTC time of the terminal device to the fourth time, to implement time synchronization.

Further, if the time information further includes the time difference between the UTC and the GPS time and the time difference between the UTC and the local time, the terminal device may further calculate the GPS time and the local time. In a possible implementation, the GPS time and the local time are obtained by using the following formula:

$$T3 = T4 + t2 + t3$$

where T3 is the local time local time of the day, T4 is the UTC time UTC time, t2 is a local time offset localTimeOffset, and t3 is the first transmission delay, for example, TA value/2 or (TA value+TA adjustment value)/2; and it may be understood that one case of the foregoing formula is that the local time of the day is calculated as UTC time+localTimeOffset (Field value*15 min)+TA value/2; and $$T5 = T4 + t4 + t5 + t3$$

where T5 is the GPS time GPS time; T4 is the UTC time timeInfoUTC; t4 is a time adjustment amount, for example, −2,524,953,600 (seconds), or another value, and this is not limited in this case; t5 is the time difference leapSeconds between the UTC and the GPS time; t3 is the first transmission delay, for example, TA value/2 or (TA value+TA adjustment amount)/2; and it may be understood that one case of the foregoing formula is GPS Time (in seconds)= timeInfoUTC (in seconds)−2,524,953,600 (seconds)+leapSeconds+TA value/2.

It should be noted that, in the foregoing description, the terminal device synchronizes the time of the terminal device based on the first transmission delay and the time information. In another possible embodiment, after receiving the first indication message, the terminal device may directly synchronize the time of the terminal device based on the time information in the first indication message.

As can be learned, there are two possible time synchronization manners: Manner 1: The terminal device performs time synchronization based on the first transmission delay and the time information. Manner 2: The terminal device performs time synchronization based on the time information. In this embodiment of this disclosure, a manner in which the terminal device performs time synchronization may be agreed on in advance by using a protocol, or the access network device may send synchronization indication information to the terminal device, to indicate the manner 1 or manner 2 in which the terminal device performs time synchronization. Further, the synchronization instruction information may be sent by using a system message, an RRC message, or a MAC CE. This is not specifically limited.

The following describes the time synchronization method in the embodiments of this disclosure with reference to several specific possible embodiments.

Embodiment 2

Figure 3:
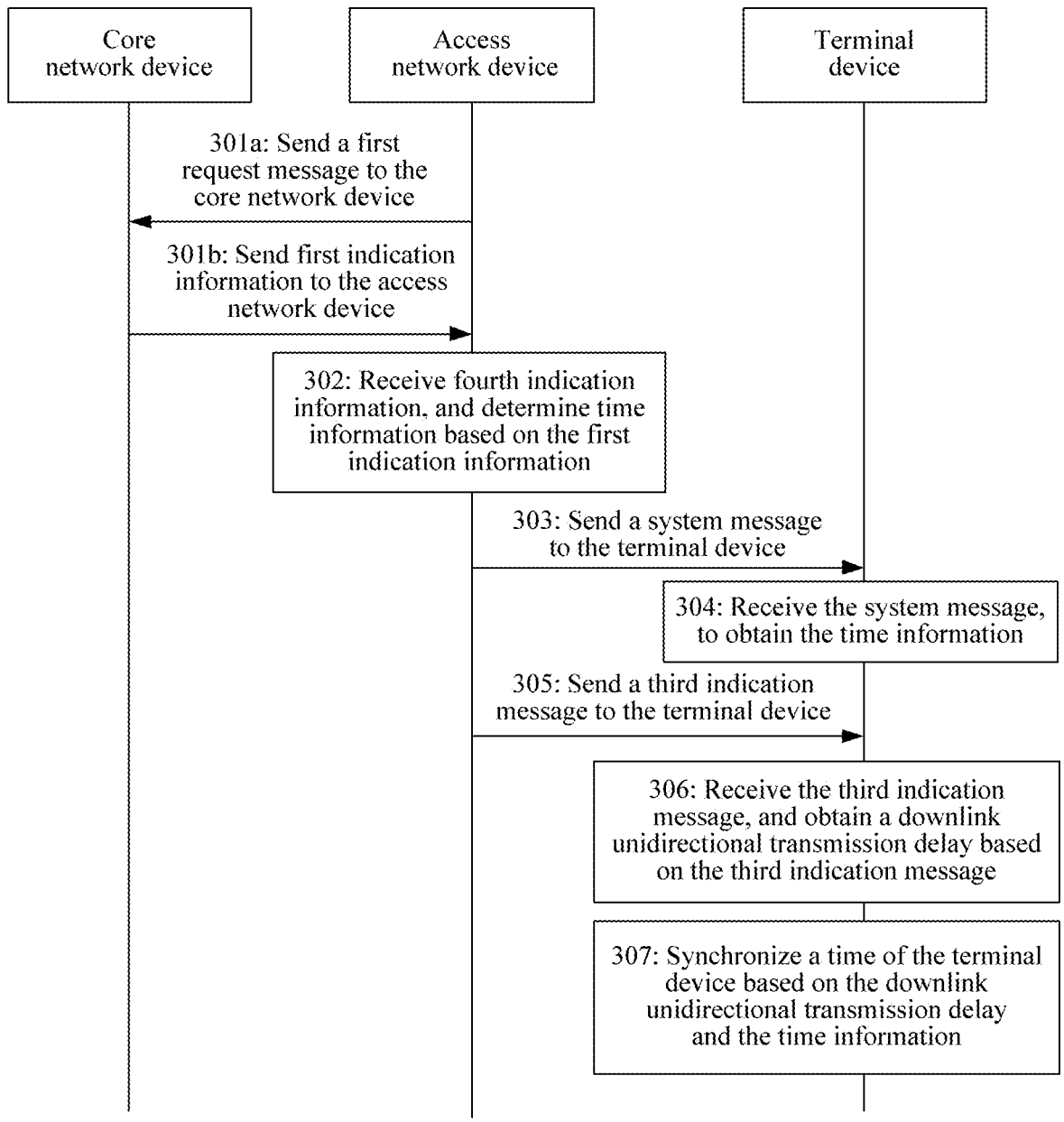
FIG. 3 is a schematic flowchart corresponding to a time synchronization method according to Embodiment 2 of this disclosure.

FIG. 3 is a schematic flowchart corresponding to a time synchronization method according to Embodiment 2 of this disclosure. As shown in FIG. 3, the method includes the following steps.

Step 301a: An access network device sends a first request message to a core network device, to request the core network device to send first indication information.

Step 301b: The core network device receives the first request message, and sends the first indication information to the access network device.

Herein, the first indication information includes granularity demand information of time information and/or QoS information of a service supported by a terminal device.

Step 302: The access network device receives the first indication information sent by the core network device, and determines the time information based on the first indication information.

Herein, a granularity of the time information determined by the access network device may be 1 us, 100 ns, or 1 ms.

Step 303: The access network device sends a system message (namely, a first indication message) to the terminal device, where the system message includes the time information.

Herein, the access network device may add the time information to a SIB 16 in an extended LTE system or a SIB (where a specific number is not limited) used to broadcast a time in a 5G communications system; or may add a new SIB to carry the time information, that is, separately send a SIB message based on enhanced time information of the SIB 16, for example, a SIB 16a. In this case, when performing time synchronization in a subsequent step, the terminal device needs to perform calculation by combining content of the SIB 16 and the SIB 16a.

Step 304: The terminal device receives the system message, to obtain the time information.

Step 305: The access network device sends a third indication message to the terminal device, where the third indication message includes uplink timing advance adjustment information.

Step 306: The terminal device receives the third indication message, and obtains a downlink unidirectional transmission delay based on the third indication message.

Specifically, the terminal device may obtain a current uplink timing advance of the terminal device based on previous uplink timing advance information and the uplink timing advance adjustment information, and further use half of the current uplink timing advance of the terminal device as the downlink unidirectional transmission delay.

Step 307: The terminal device synchronizes time of the terminal device based on the downlink unidirectional transmission delay and the time information.

In this embodiment of this disclosure, the foregoing step numbers are merely an example representation of an execution process, and do not constitute a specific limitation on an execution sequence.

For specific implementation processes of the foregoing steps, refer to related descriptions in Embodiment 1. Details are not described herein again.

In the foregoing manner, time synchronization between the terminal device and the access network device can be implemented without changing a chip of the terminal device. Further, the granularity of the time information is 1 us, 100 ns, or 1 ms, namely, a high-accuracy time unit, which can effectively improve accuracy of time synchronization.

Embodiment 3

Figure 4:
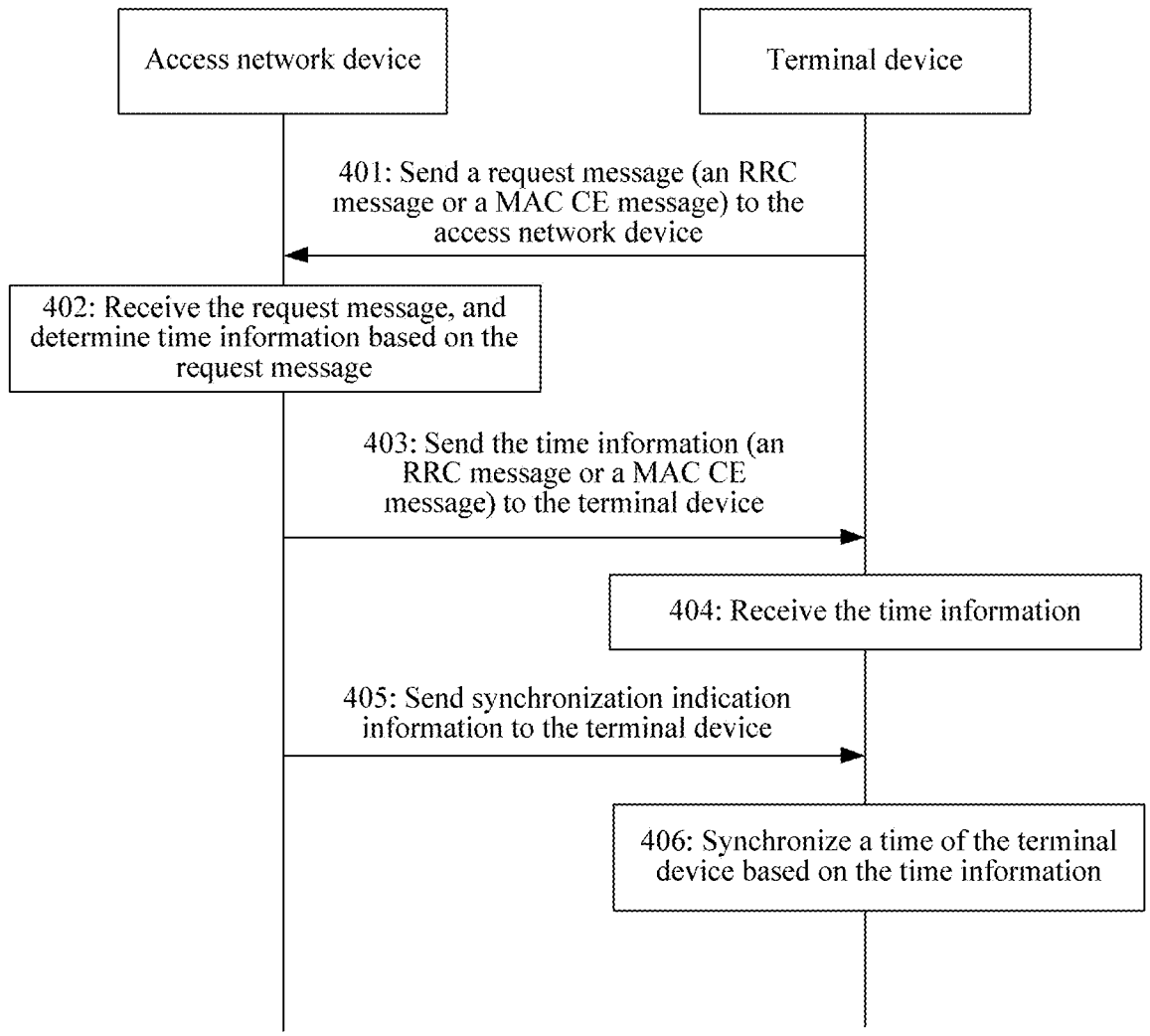
FIG. 4 is a schematic flowchart corresponding to a time synchronization method according to Embodiment 3 of this disclosure.

FIG. 4 is a schematic flowchart corresponding to a time synchronization method according to Embodiment 3 of this disclosure. As shown in FIG. 4, the method includes the following steps.

Step 401: A terminal device sends a request message to an access network device, where the request message may be specifically an RRC message or a MAC CE message.

Herein, the request message may include at least one of the following: demand information of time information, granularity demand information of the time information, QoS information of a service supported by the terminal device, and a time type requested by the terminal device.

Step 402: The access network device receives the request message, and determines the time information based on the request message.

Step 403: The access network device sends the time information to the terminal device, where the time information may be specifically carried in an RRC message or a MAC CE message.

Step 404: The terminal device receives the time information.

Step 405: The access network device sends synchronization indication information to the terminal device.

Herein, the synchronization indication information is used to indicate a manner in which the terminal device performs time synchronization. Specifically, the synchronization indication information may indicate that the terminal device directly performs time synchronization based on the time information, or may indicate that the terminal device performs time synchronization based on a downlink unidirectional transmission delay and the time information.

In an example, the synchronization indication information may include one bit. When a value of the synchronization indication information is "0", the synchronization indication information is used to indicate that the terminal device directly performs time synchronization based on the time information. When the value of the synchronization indication information is "1", the synchronization indication information is used to indicate that the terminal device performs time synchronization based on the downlink unidirectional transmission delay and the time information.

In this embodiment of this disclosure, an example in which the synchronization indication information indicates that the terminal device directly performs time synchronization based on the time information is used.

Step 406: The terminal device synchronizes time of the terminal device based on the time information.

In this embodiment of this disclosure, the foregoing step numbers are merely an example representation of an execution process, and do not constitute a specific limitation on an execution sequence.

For specific implementation processes of the foregoing steps, refer to related descriptions in Embodiment 1. Details are not described herein again.

In the foregoing manner, time synchronization between the terminal device and the access network device can be implemented without changing a chip of the terminal device. In addition, because the access network device sends the time information to the terminal device when receiving the request message sent by the terminal device, time synchronization can be implemented as required, thereby avoiding a waste of resources.

It should be noted that step 401 is an optional step. In another embodiment, step 401 may not be performed. To be specific, the access network device directly determines the time information, and sends the time information to the terminal device by using the RRC message or the MAC CE message.

Embodiment 4

Figure 5:
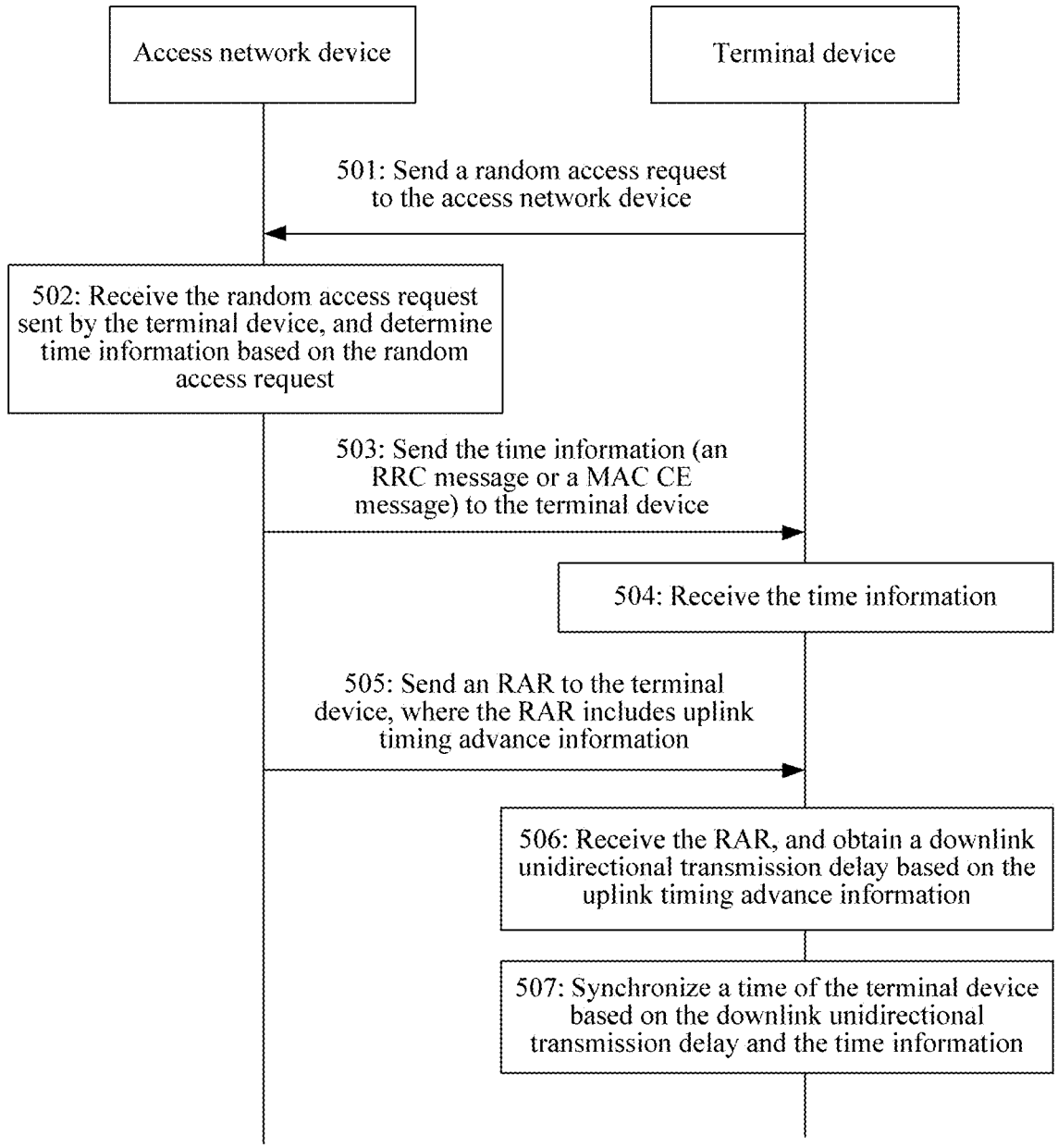
FIG. 5 is a schematic flowchart corresponding to a time synchronization method according to Embodiment 4 of this disclosure.

FIG. 5 is a schematic flowchart corresponding to a time synchronization method according to Embodiment 4 of this disclosure. As shown in FIG. 5, the method includes the following steps.

Step 501: A terminal device sends a random access request to an access network device.

Herein, a preamble of the random access request is a preset preamble and/or a PRACH used by the random access request is a preset PRACH. The preset preamble or the preset PRACH is a preamble or a PRACH used to request time information.

Step 502: The access network device receives the random access request sent by the terminal device, and determines the time information based on the random access request.

In this embodiment of this disclosure, the preset preamble and/or the preset PRACH used to request the time information may be pre-agreed on in a protocol, or may be determined by the access network device and the terminal device through negotiation in a plurality of manners.

In a possible implementation, the access network device selects a preset preamble and/or a preset PRACH from a plurality of preambles and/or a plurality of PRACHs, determines a mapping relationship between the preset preamble and/or the preset PRACH and a time request, and sends the mapping relationship to the terminal device. Correspondingly, the terminal device receives and stores the mapping relationship. When the terminal device needs to request the time information, the terminal device may determine, based on the mapping relationship, the preset preamble and/or the preset PRACH required to initiate the random access request, to implicitly notify the access network device that the purpose of the random access request is to request the time information.

For example, the preset preamble selected by the access network device is a preamble 0, and the preset PRACH is a PRACH 0. Table 2 shows an example of the mapping relationship between a preset preamble and/or a preset PRACH and a time request.

TABLE 2

Example of the mapping relationship

| Time request | Preamble | PRACH |
|---|---|---|
| | Preamble 0 | PRACH 0 |
| | Preamble 0 | *** |
| | *** | PRACH 0 |

The mapping relationship shown in Table 2 indicates that when the terminal device sends the preamble 0 by using the PRACH 0, or sends the preamble 0 by using a PRACH other than the PRACH 0, or sends a preamble other than the preamble 0 by using the PRACH 0, the purpose is to request the time information. Correspondingly, after receiving the random access request used to request the time information, the access network device may determine the time information based on the random access request. When the terminal device sends a preamble other than the preamble 0 by using a PRACH other than the PRACH 0, for example, the terminal device sends a preamble 1 by using a PRACH 1, it is a normal random access request and does not have the purpose of requesting the time information. Correspondingly, the access network device may perform a related procedure of a normal random access procedure.

In this embodiment of this disclosure, a mapping relationship between a preset preamble and/or a preset PRACH and a requested time type may further be set. Refer to Table 3.

TABLE 3

Another example of the mapping relationship

| Time request | Preamble | PRACH | Requested time type |
|---|---|---|---|
| | Preamble 0 | PRACH 0 | UTC |
| | Preamble 0 | *** | UTC and GPS time |
| | *** | PRACH 0 | UTC, GPS time, and local time |

The mapping relationship shown in Table 3 indicates that when the terminal device sends the preamble 0 by using the PRACH 0, the time type requested by the terminal device corresponds to the UTC; when the terminal device sends the preamble 0 by using a PRACH other than the PRACH 0, the time type requested by the terminal device corresponds to the UTC and the GPS time; and when the terminal device sends a preamble other than the preamble 0 by using the PRACH 0, the time type requested by the terminal device corresponds to the UTC, the GPS time, and the local time. Correspondingly, the access network device may determine the time information based on the time type requested by the terminal device.

In this manner, based on that the preset preamble and/or the preset PRACH are/is used to request the time information, a specific time type requested by the terminal device is further indicated, so that the terminal device can choose, based on a requirement, to use a corresponding preamble and a corresponding PRACH. In addition, the access network device does not need to be notified of the requested time type by using additional information. This is not only convenient for implementation, but also can effectively save resources.

It should be noted that Table 2 and Table 3 are merely example representations. During specific implementation, a transformation may be performed based on Table 2 and Table 3, and a specific mapping relationship is set based on an actual requirement. For example, a mapping relationship between a preset preamble and/or a preset PRACH and a granularity of time information may further be set. This is not limited in this disclosure.

Step 503: The access network device sends the time information to the terminal device, where the time information may be specifically carried in an RRC message or a MAC CE message.

Step 504: The terminal device receives the time information.

Step 505: The access network device sends an RAR to the terminal device, where the RAR includes uplink timing advance information.

Step 506: The terminal device receives the RAR, and obtains a downlink unidirectional transmission delay based on the uplink timing advance information.

Step 507: The terminal device synchronizes time of the terminal device based on the downlink unidirectional transmission delay and the time information.

In this embodiment of this disclosure, the foregoing step numbers are merely an example representation of an execution process, and do not constitute a specific limitation on an execution sequence.

For specific implementation processes of the foregoing steps, refer to related descriptions in Embodiment 1. Details are not described herein again.

In the foregoing manner, time synchronization between the terminal device and the access network device may be implemented without changing a chip of the terminal device, and the manner is applicable to terminal devices in different states, such as an idle state, a connected state, and a deactivated state, that is, has relatively strong application performance. In addition, the terminal device implicitly notifies the access network device of the purpose of requesting the time information, so that time synchronization can be performed as required.

Embodiment 5

Figure 6:
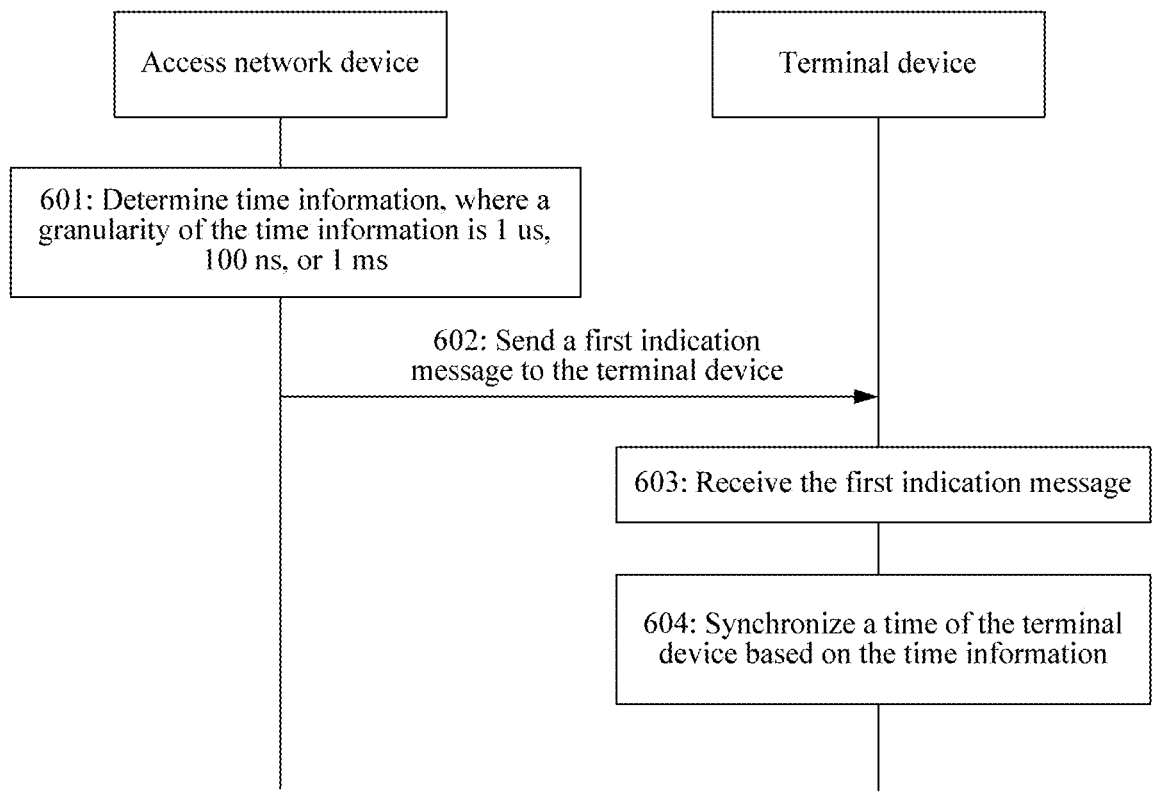
FIG. 6 is a schematic flowchart corresponding to a time synchronization method according to Embodiment 5 of this disclosure.

FIG. 6 is a schematic flowchart corresponding to a time synchronization method according to Embodiment 5 of this disclosure. As shown in FIG. 6, the method includes the following steps.

Step 601: An access network device determines time information.

Herein, the time information may include a time of a first time type, for example, XX:XX:XX:XX, which is accurate to microsecond, or XX:XX:XX:XX:XX, which is accurate to nanosecond. The first time type may correspond to UTC.

Further, the time information may include a time difference between the first time type and another time type (a GPS time or a local time), for example, a time difference between the UTC and the GPS time, or a time difference between the UTC and the local time.

In this embodiment of this disclosure, a time unit used for the time information may be any time unit whose accuracy is higher than or equal to millisecond (ms), for example, microsecond (us), nanosecond (ns), or a time unit that may be more accurate in the future. When any time unit is used for the time information, a granularity value of the time information may be flexibly set. For example, when the time unit used for the time information is nanosecond, the granularity value of the time information may be any value greater than or equal to 1 and less than or equal to . For example, if the granularity value of the time information is 50, the granularity of the time information is 50 ns. For another example, when the granularity value of the time information is 100, the granularity of the time information is 100 ns. For still another example, when the time unit used for the time information is microsecond, the granularity value of the time information may be any value greater than or equal to 1 and less than or equal to . For example, if the granularity value of the time information is 1, the granularity of the time information is 1 us. For another example, if the granularity value of the time information is 10, the granularity of the time information is 10 us.

It can be learned that the granularity of the time information may be 1 μs, 10 μs, 50 ns, 100 ns, or 1 ms. This is merely an example based on the foregoing description, and is not specifically limited. A granularity of time information that includes another value and time unit that meet the foregoing description falls within the protection scope of this disclosure.

The access network device may determine the time information in a plurality of manners. For details, refer to related descriptions in Embodiment 1.

Step 602: The access network device sends a first indication message to the terminal device, where the first indication message includes the time information of the terminal device.

Herein, the access network device may send the first indication message to the terminal device in a broadcast, unicast, or multicast manner. This is not specifically limited.

Specifically, the first indication message may be a system message, an RRC message, or a MAC CE message.

Further, the first indication message may further include at least one of the following: a time information reference point and a time type. For details, refer to the descriptions in Embodiment 1.

Step 603: The terminal device receives the first indication message sent by the access network device.

Correspondingly, the terminal device may receive the first indication message from the access network device in a broadcast, unicast, or multicast manner, and obtain the time information.

Step 604: The terminal device synchronizes time of the terminal device based on the time information.

Herein, the terminal device may update UTC of the terminal device to a time corresponding to a first time type included in the time information. Further, if the time information further includes the time difference between the UTC and the GPS time and the time difference between the UTC and the local time, the terminal device may further calculate the GPS time and the local time.

It should be noted that the terminal device may update any one or any combination of the UTC, the GPS time, and the local time based on the time information. This is not limited in this disclosure.

In this embodiment of this disclosure, because the granularity of the time information determined by the access network device is 1 us, 100 ns, or 1 ms, namely, a high-accuracy time unit, accuracy of time synchronization performed by the terminal device can be effectively improved.

Embodiment 6

This disclosure provides a time synchronization method. The method includes: receiving, by a terminal device, a first time sent by an access network device; obtaining, by the terminal device, a first transmission delay; obtaining a fourth time based on the first transmission delay and the first time; and synchronizing, by the terminal device, time of the terminal device based on the fourth time.

Further, the first time includes a second time and a third time, the second time is a millisecond-level time, and the third time is a microsecond-level time and/or a nanosecond-level time. In an example, the first time is obtained based on a sum of the second time and the third time.

For example, if the second time is 12:00:00:00, which is accurate to millisecond, and the third time is 00:00:00:00:03, which is accurate to microsecond, the first time is 12:00:00:00:03, which is accurate to microsecond. For example, if the second time is 12:00:00:00, which is accurate to millisecond, and the third time is 00:00:00:00:03:05, which is accurate to nanosecond, the first time is 12:00:00:00:03:05, which is accurate to nanosecond.

In this embodiment of this disclosure, the access network device may send the second time to the terminal device in a broadcast, unicast, or multicast manner. In addition, the access network device may send the third time to the terminal device in a broadcast, unicast, or multicast manner. Correspondingly, the terminal device may receive, in a broadcast, unicast, or multicast manner, the second time sent by the access network device. In addition, the terminal device may receive, in a broadcast, unicast, or multicast manner, the third time sent by the access network device.

Specifically, the access network device may send the second time and the third time by using one message, for example, send the second time and the third time by a system message (for example, an extended SIB 16); or the access network device may send the second time and the third time by using different messages, for example, send the second time by a system message (for example, a SIB 16), and send the third time by using another message (for example, an RRC message). This is not specifically limited.

In this disclosure, before the receiving, by a terminal device, a first time sent by an access network device, the method further includes: sending, by the terminal device, a first message to the access network device, where the first message includes an instruction used to request to synchronize a time of the terminal device.

In a possible implementation, the first message includes at least one of the following: a message for requesting the first time and a message for requesting the third time.

In another possible implementation, the first message includes at least one of the following: time accuracy information needed to be obtained by the terminal device, and a time type requested by the terminal device.

In this embodiment of this disclosure, the first message is one of the following: an RRC message, a media access control control element MAC CE message, and a random access request message used for time synchronization.

In this embodiment of this disclosure, the first time and the fourth time represent a time of a boundary of a particular frame, subframe, slot, mini slot, or symbol.

Embodiment 7

This embodiment of this disclosure provides a time synchronization method. The method includes: sending, by a terminal device, a first message to an access network device, where the first message is used to request to obtain a fourth time; receiving, by the access network device, the first message, obtaining a fourth time, and sending the fourth time to the terminal device; and receiving, by the terminal device, the fourth time sent by the access network device, and synchronizing time of the terminal device based on the fourth time.

In this embodiment, after receiving the first message, the access network device may obtain the fourth time based on a first time and a first transmission delay. In this way, the terminal device may directly perform time synchronization based on the received fourth time, thereby effectively reducing processing load of the terminal device and improving accuracy of time synchronization.

For the foregoing method procedure, this embodiment of this disclosure provides a communications apparatus. For specific implementation of the communications apparatus, refer to the foregoing method procedure.

Figure 7:
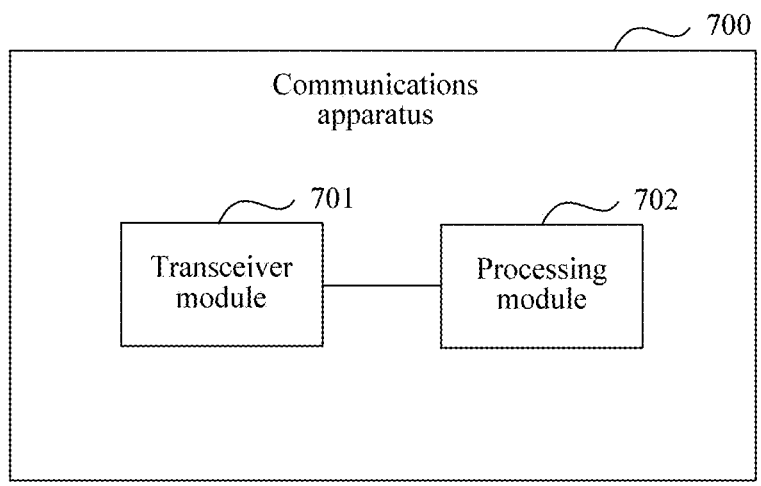
FIG. 7 is a schematic structural diagram of a communications apparatus according to an embodiment of this disclosure.

Based on a same concept, FIG. 7 is a schematic structural diagram of a communications apparatus 700 according to an embodiment of this disclosure. The communications apparatus may be a terminal device, and is configured to implement corresponding procedures or steps performed by the terminal device in the method embodiments shown in FIG. 2 to FIG. 6. The communications apparatus 700 includes: a transceiver module 701, configured to receive a first time sent by an access network device; and a processing module 702, configured to: obtain a first transmission delay, obtain a fourth time based on the first transmission delay and the first time, and synchronize time of the terminal device based on the fourth time.

In a possible design, the first time includes a second time and a third time; and the second time is a millisecond-level time, and the third time is a microsecond-level time and/or a nanosecond-level time.

In a possible design, the first time is obtained based on a sum of the second time and the third time.

In a possible design, the transceiver module 701 is specifically configured to: receive, in a broadcast or unicast manner, the second time and the third time that are sent by the access network device.

In a possible design, before receiving the first time sent by the access network device, the transceiver module 701 is further configured to: send a first message to the access network device, where the first message is used to request to synchronize a time of the terminal device, where the first message includes at least one of the following: a message for requesting the first time and a message for requesting the third time.

In a possible design, the first message includes at least one of the following: time accuracy information needed to be obtained by the terminal device, and a time type requested by the terminal device.

In a possible design, the first message is one of the following: an RRC message, a media access control control element (MAC CE) message, and a random access request message used for time synchronization.

In a possible design, the processing module 702 is specifically configured to: obtain the fourth time based on a sum of the first time and the first transmission delay.

In a possible design, the processing module 702 is specifically configured to: obtain uplink timing advance information, and obtain the first transmission delay based on the uplink timing advance information.

In a possible design, the transceiver module is further configured to receive a first message sent by the access network device, where the first message includes the uplink timing advance information; or the transceiver module is further configured to receive a second message sent by the access network device, where the second message includes uplink timing advance adjustment information; and the processing module 702 is specifically configured to update current uplink timing advance information of the terminal device based on previous uplink timing advance information and the uplink timing advance adjustment information.

In a possible design, the first time or the fourth time represents a time of a boundary of a particular frame, subframe, slot, mini slot, or symbol.

Based on FIG. 7, in another embodiment, the communications apparatus 700 includes: a transceiver module 701, configured to receive a first indication message sent by an access network device, where the first indication message includes time information of the terminal device, and a granularity of the time information is 1 us, 100 ns, or 1 ms; and a processing module 702, configured to synchronize time of the terminal device based on the time information.

Figure 8:
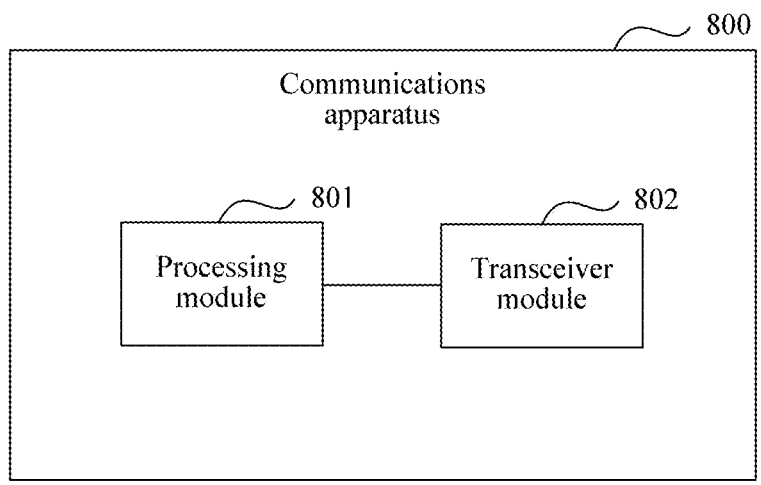
FIG. 8 is a schematic structural diagram of another communications apparatus according to an embodiment of this disclosure.

Based on a same concept, FIG. 8 is a schematic structural diagram of a communications apparatus according to an embodiment of this disclosure. The communications apparatus may be an access network device, and is configured to implement corresponding procedures or steps performed by the access network device in the method embodiments shown in FIG. 2 to FIG. 6. The communications apparatus 800 includes: a processing module 802, configured to determine a first time; and a transceiver module 801, configured to send the first time to a terminal device, where the first time is used to synchronize time of the terminal device.

In a possible design, the first time includes a second time and a third time; and the second time is a millisecond-level time, and the third time is a microsecond-level time and/or a nanosecond-level time.

In a possible design, the first time is obtained based on a sum of the second time and the third time.

In a possible design, the transceiver module is specifically configured to: send the second time and the third time to the terminal device in a broadcast or unicast manner.

In a possible design, before the sending, by the access network device, the first time to a terminal device, the method further includes: receiving, by the access network device, a first message sent by the terminal device, where the first message is used to request to synchronize the time of the terminal device, where the first message includes at least one of the following: a message for requesting the first time and a message for requesting the third time.

In a possible design, the first message includes at least one of the following: time accuracy information needed to be obtained by the terminal device, and a time type requested by the terminal device.

In a possible design, the first message is one of the following: an RRC message, a media access control control element MAC CE message, and a random access request message used for time synchronization.

In a possible design, the first time represents a time of a boundary of a particular frame, subframe, slot, mini slot, or symbol.

Based on FIG. 8, in another embodiment, the communications apparatus 800 includes: a processing module 801, configured to determine time information, where a granularity of the time information is 1 us, 100 ns, or 1 ms; and a transceiver module 802, configured to send a first indication message to a terminal device, where the first indication message includes the time information.

It should be noted that, in this embodiment of this disclosure, module division is an example, and is merely logical function division. During actual implementation, another division manner may be used. Functional modules in the embodiments of this disclosure may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this disclosure essentially, or the part contributing to the prior art, or all or some of the technical solutions may be implemented in the form of a software product. The software product is stored in a storage medium and includes several instructions for instructing a computer device (which may be a personal computer, a server, or a network access device) or a processor to perform all or some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

Figure 9:
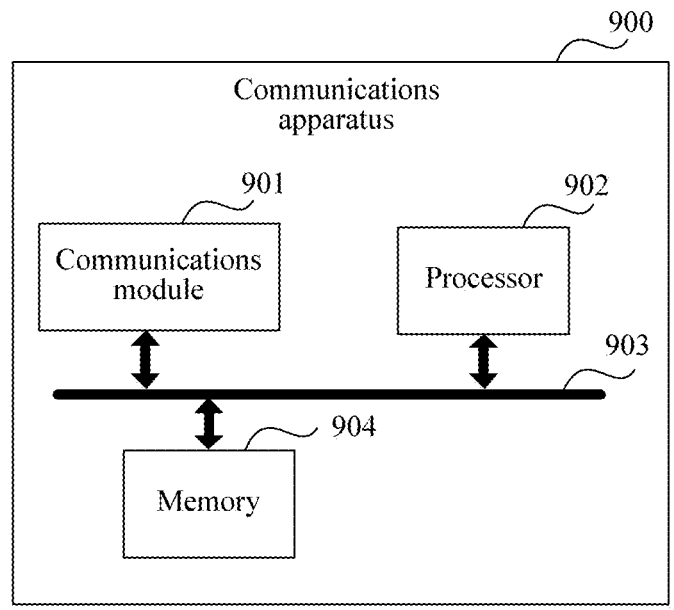
FIG. 9 is a schematic structural diagram of another communications apparatus according to an embodiment of this disclosure.

Based on a same concept, FIG. 9 is a schematic structural diagram of still another communications apparatus according to an embodiment of this disclosure. The communications apparatus may be a terminal device, and is configured to implement corresponding procedures or steps performed by the terminal device in the method embodiments shown in FIG. 2 to FIG. 6. The communications apparatus includes a communications module 901 and a processor 902.

The communications module 901 is configured to perform communication interaction with another device, and the communications module 901 may be an RF circuit, a Wi-Fi module, a communications interface, a Bluetooth module, or the like.

The processor 902 is configured to implement a function of the processing module 702 in FIG. 7.

Optionally, the communications apparatus 900 may further include a memory 904, configured to store a program and the like. Specifically, the program may include program code, and the program code includes an instruction. The memory 904 may include a RAM, or may include a non-volatile memory, for example, at least one magnetic disk memory. The processor 902 executes an application program stored in the memory 904, to implement the foregoing functions.

In a possible manner, the communications module 901, the processor 902, and the memory 904 may be connected to each other by using a bus 903. The bus 903 may be a PCI bus, an EISA bus, or the like. The bus may be classified into an address bus, a data bus, a control bus, and the like. For ease of representation, only one thick line is used to represent the bus in FIG. 9, but this does not mean that there is only one bus or only one type of bus.

Figure 10:
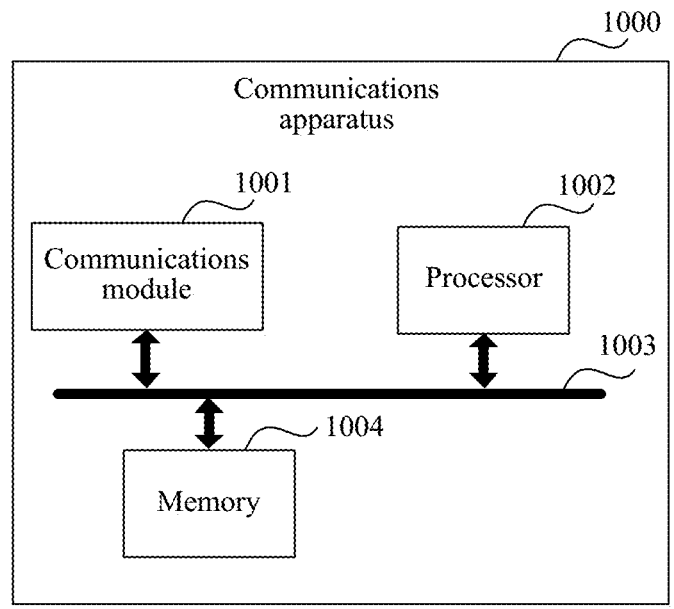
FIG. 10 is a schematic structural diagram of another communications apparatus according to an embodiment of this disclosure.

Based on a same concept, FIG. 10 is a schematic structural diagram of still another communications apparatus according to an embodiment of this disclosure. The communications apparatus may be a terminal device, and is configured to implement corresponding procedures or steps performed by the terminal device in the method embodiments shown in FIG. 2 to FIG. 6. The communications apparatus includes a communications module 1001 and a processor 1002.

The communications module 1001 is configured to perform communication interaction with another device, and the communications module 1001 may be an RF circuit, a Wi-Fi module, a communications interface, a Bluetooth module, or the like.

The processor 1002 is configured to implement a function of the processing module 802 in FIG. 8.

Optionally, the communications apparatus 1000 may further include a memory 1004, configured to store a program and the like. Specifically, the program may include program code, and the program code includes an instruction. The memory 1004 may include a RAM, or may include a non-volatile memory, for example, at least one magnetic disk memory. The processor 1002 executes an application program stored in the memory 1004, to implement the foregoing functions.

In a possible manner, the communications module 1001, the processor 1002, and the memory 1004 may be connected to each other by using a bus 1003. The bus 1003 may be a PCI bus, an EISA bus, or the like. The bus may be classified into an address bus, a data bus, a control bus, and the like. For ease of representation, only one thick line is used to represent the bus in FIG. 10, but this does not mean that there is only one bus or only one type of bus.

In the prior art, an access network device broadcasts a time, for example, a UTC, by using a SIB 16, and a terminal device synchronizes a time of the terminal device based on the received time. However, because a time unit of the time broadcast by the access network device is 10 ms, time synchronization is not accurate enough. Based on this, an embodiment of this disclosure further provides a time synchronization method. The method includes: determining, by an access network device, time information, and sending the time information to a terminal device; correspondingly, receiving, by the terminal device, the time information sent by the access network device, and obtaining a first time based on the time information, so that the terminal device can synchronize a time of the terminal device based on the first time. In this way, because a time unit of the first time is n microseconds, n nanoseconds, n femtoseconds, or n milliseconds, n>0, and n<10 when the time unit is n milliseconds, accuracy of the first time is relatively high, and accuracy of time synchronization can be effectively improved. The time unit herein may also be a time element, a time granularity, or time accuracy. The time unit is used by the terminal device to count time. For example, a time with duration of 1 second is counted by using a time unit of 1 millisecond, and 1000 times are counted, where 1 second=1 millisecond*1000.

Specifically, in this embodiment of this disclosure, the time unit of the first time may alternatively be a time unit having a fixed length, for example, n TTIs, n slots, n mini-slots, n subframes, n frames, n symbols, or the like, where n>0. This is not specifically limited.

The time information may indicate the first time in a plurality of manners, and the time information may be a first value. In an example, the first value may be 2. The terminal device may further receive first indication information from the access network device, where the first indication information is used to indicate the time unit of the first time, for example, 3 microseconds. In this way, the terminal device may multiply the first value by the time unit of the first time (where for example, the first value is multiplied by the time unit of the first time: 2*3 microseconds), to obtain that the first time is 6 microseconds. In this case, it may be understood that the first time is a high-accuracy part of a time.

In another example, for example, the first value may be 2, and the time unit of the first time is a preset time unit (which may be determined through negotiation between the access network device and the terminal device, or specified in a protocol), for example, 4 microseconds. The terminal device may obtain, based on a product of the first value and the time unit of the first time (2×4 microseconds=8 microseconds), that the first time is 8 microseconds. Another implementation may exist, and details are not described herein.

In another example, the first time may be understood as a determined time point, for example, 2017-01-01 10:05:01:01. The first value is a bit string, and bits from a most significant bit to a least significant bit respectively represent year, month, day, hour, minute, second, millisecond, microsecond, and the like. Year, month, day, hour, minute, second, millisecond, and microsecond are respectively represented by using different bit groups, and each bit group has fixed bits. For example, a bit group indicating year is 16 most significant bits. Sequentially, a bit group indicating month is next 4 bits (the 5th bit to the 8th bit of the most significant bits). A bit group indicating day is 5 bits (the 9th to the 13th of the most significant bits). A bit group indicating hour is 5 bits (the 14th bit to the 18th bit of the most significant bits). A bit group indicating minute is 6 bits (the 14th bit to the 18th bit of the most significant bits). A bit group indicating second is 6 bits (the 19th bit to the 24th bit of the most significant bits). A bit group indicating millisecond is 10 bits (the 25th bit to the 30 th bit of the most significant bits). A bit group indicating microsecond is 10 bits (the 31 st bit to the 40 th bit of the most significant bits). When the first value is 0000100000000001000 0010010010 000001100100 0000000001 0000000001, it indicates:

year=a decimal value corresponding to the binary value 0000 1000 0000 0000=2048, indicating year 2048 month=a decimal value corresponding to the binary value 1000=August day=00100=4th hour=10010=18 o'clock (18:00, 24-hour clock)

minute=000001=1 minute second=100100=36 seconds millisecond=0000000001=1 millisecond microsecond=0000000001=1 microsecond It can be learned from the foregoing that a fifth time represented by the first time is 2048-08-04 16:01:36:01:01. In this case, the first time is directly equal to the fifth time. Optionally, the first time is a complete time.

The terminal device may directly synchronize the time of the terminal device by using the first time. For example, if the first time is 2017-02-12 08:01:01:01:01, the terminal device may update the time of the terminal device to the first time.

In another possible implementation, the first time is a high-accuracy part of a time, and further, the first time may be a time less than 10 milliseconds. In this way, the terminal device may receive a second time sent by the access network device (where during specific implementation, the access network device may send the second time in a unicast, broadcast, or multicast manner), and a time unit of the second time is 10 milliseconds. The second time is combined with the first time (for example, the first time and the second time are added), to obtain a third time.

In this case, the first time is a time part less than 10 milliseconds in the third time. For example, the first time obtained by the terminal device is 6 microseconds, and the second time is 08:01:01:10, which is accurate to millisecond. Optionally, the second time may be obtained from a SIB 16. In this case, the third time is 08:01:01:10:06, which is accurate to microsecond. The terminal device may further obtain a preset time. The preset time may be a time point (for example, may be a past time point) specified in a protocol, for example, 2017-02-12 00:00:00. In this way, the terminal device adds the third time to the preset time, to obtain the fifth time 2017-02-12 08:01:01:10:06, and the time of the terminal device may be synchronized to 2017-02-12 08:01:01:10:06.

Optionally, the terminal device may alternatively obtain the fifth time with reference to a timing advance.

The first time herein may be understood as a time period, a time length, or a time domain length.

For another example, the first time is equal to 0-0-0 01:01:01:01:01 (or equal to 3661001000 microseconds). The terminal device may obtain, based on a sum of the first time and a preset time (where the preset time is a time point or a moment, for example, 2017-01-01 00:00:00), that the fifth time is 2017-01-01 01:01:01:01:01 (where similarly, the terminal device may alternatively obtain the fifth time with reference to the timing advance).

That is, 0-0-0 01:01:01:01:01+2017-01-01 00:00:00=2017-01-01 01:01:01:01:01.

Particularly, the preset time may be a time origin of a UTC time: 1900-01-01 00:00:00, or a time origin of a GPS time: 1980-01-06 00:00:00.

When the time origin does not include a high-accuracy part (for example, does not include accuracy of microsecond or nanosecond), a value of the high-accuracy part is 0 (0 microseconds and 0 nanoseconds) during calculation.

2017-01-01 00:00:00+1 day, 1 hour, 1 minute, 1 second, 1 millisecond, and 1 microsecond=2017-01-02 01:01:01:01:01.

Further, after obtaining the fifth time, the terminal device may perform a plurality of possible operations based on the fifth time, for example, synchronize the time of the terminal device based on the fifth time.

Further, the fifth time is a GPS time, and the preset time is a time origin of the GPS time, namely, 1980-01-06 00:00:00. The time origin indicates a start point of time.

The following describes the foregoing time synchronization method with reference to specific embodiments (Embodiment 8 to Embodiment 10).

Embodiment 8

Figure 11A:
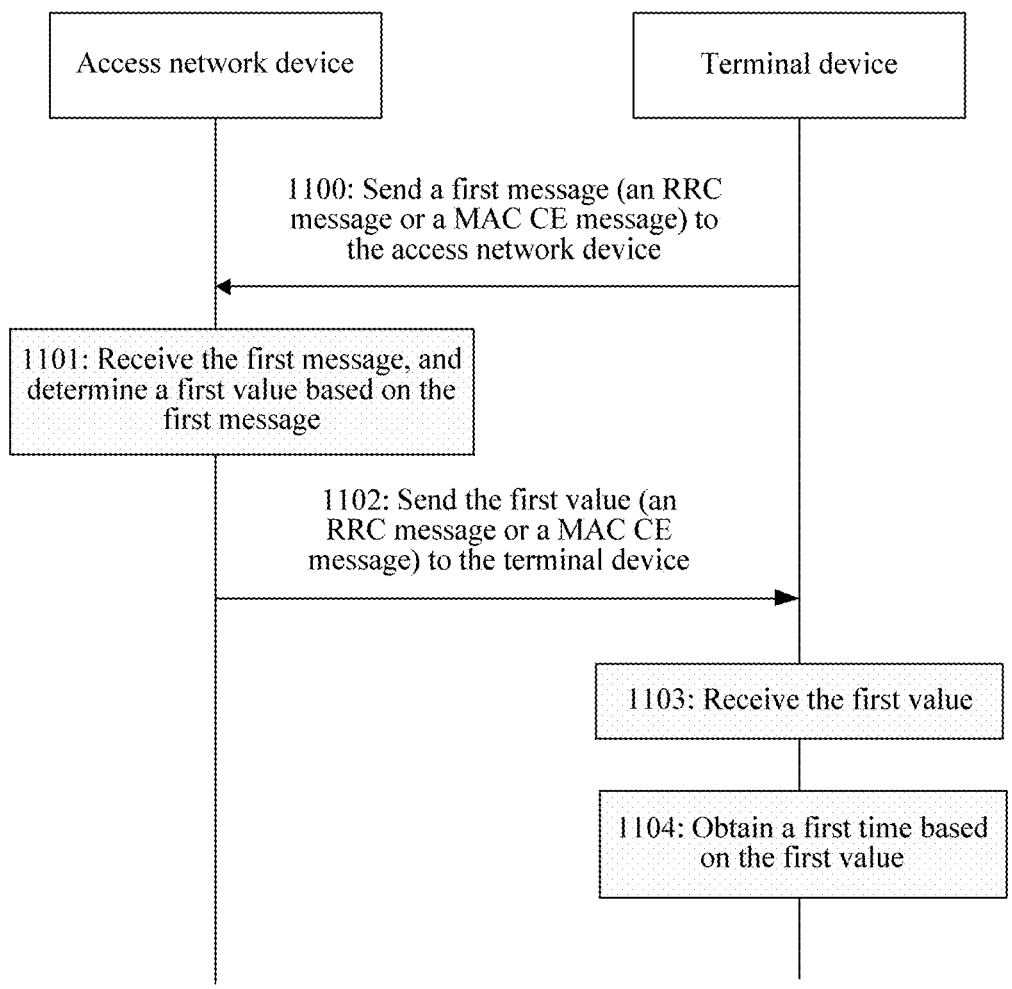
FIG. 11a is a schematic flowchart corresponding to a time synchronization method according to Embodiment 8 of this disclosure.

FIG. 11a is a schematic flowchart corresponding to a time synchronization method according to Embodiment 8 of this disclosure. As shown in FIG. 11a, the method includes the following steps.

Step 1101: An access network device determines time information, where the time information includes a first value, the first value is used to indicate a first time, and a time unit of the first time is n microseconds, n nanoseconds, n femtoseconds, or n milliseconds.

Herein, the access network device may determine the time information based on a capability of the access network device. For example, if a time unit supported by the capability of the access network device is 1 microsecond, the time unit of the first time indicated by the first value is 1 microsecond.

Optionally, in step 1100, a terminal device sends a first message.

The access network device may determine the first value based on the first message sent by the terminal device. The first message is used to request the access network device to send the first value to the terminal device.

Further, the first message may indicate the time unit of the first value required by the terminal device, may further indicate whether a message in which the first value is located needs to be encrypted and/or integrity protected, and may further indicate a time standard, for example, a GPS time or a UTC time, by which the terminal device needs to perform time synchronization.

Step 1102: The access network device sends a unicast message to the terminal device, where the unicast message includes the first value.

Herein, the unicast message may be specifically an RRC message, a MAC CE, or DCI. This is not specifically limited.

Step 1103: The terminal device receives the unicast message sent by the access network device, and obtains the first value.

Herein, the unicast message may further include a frame number of a first system frame. In this way, the terminal device may obtain, based on the frame number of the first system frame and a frame number of a second system frame, a system frame corresponding to a fifth time. The second system frame is a system frame in which the terminal device receives the first value (namely, a system frame in which the unicast message carrying the first value is successfully transmitted). The fifth time corresponds to a frame header boundary or a frame trailer boundary of the first system frame. The first system frame may be considered as a time information reference point of the fifth time, and is used to indicate a time domain location corresponding to the fifth time obtained by the terminal device.

A distance between the two system frames may be a time interval (calculated based on a quantity of frames) between frame headers of the two frames or a time interval between frame trailers of the two frames.

In a possible implementation, the time information reference point is a frame header boundary or a frame trailer boundary of a first frame, a frame number of the first frame is a first system frame number, and the first system frame is a system frame that is closest to the second system frame and whose frame number is equal to the first system frame number. Further, when the frame number of the first system frame is the same as the frame number of the second system frame, the first system frame is the second system frame.

For example, if the terminal device receives the first value in an SFN 6, that is, a frame number of a system frame in which the first value is located is 6, it indicates that the frame number of the second system frame is 6. If the frame number of the first system frame indicated in the unicast message is 8, the first system frame is an SFN 8 that is located after the SFN 6 and that is closest to the SFN 6.

Figure 11B:
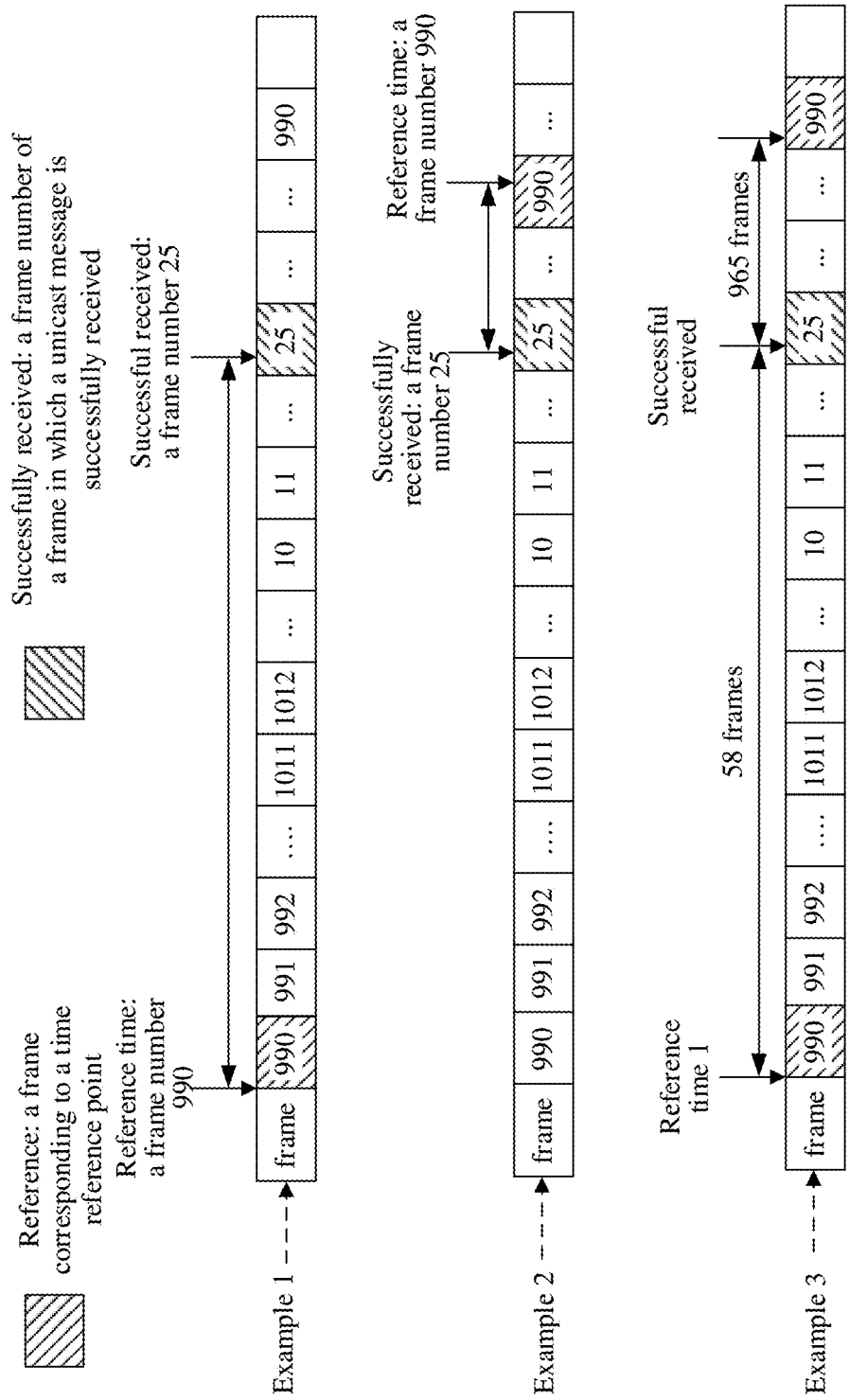
FIG. 11b is a schematic diagram of a process of determining a time information reference point.

The following further describes the time information reference point with reference to FIG. 11b. In this embodiment of this disclosure, a distance between two system frames may be a time domain interval (calculated based on a quantity of frames) between frame headers of the two frames or a time interval between frame trailers of the two frames.

As shown in FIG. 11b, in Example 1, a frame header or frame trailer boundary of (a time domain location or location of) a system frame that is located before the second system frame, that is closest to the second system frame, and whose frame number is a first frame number is a time reference point of the first time. For example, the frame number of the first system frame carried in the unicast message is 990, a frame number of a frame in which UE successfully receives the unicast message is 25, and the UE finds, before a time domain location of the frame 25, a frame 990 (whose time domain location is the 990 th frame in a previous period including 1024 frames) closest to the frame 25, and determines that the first time corresponds to a time corresponding to a frame header boundary or a frame trailer boundary of the frame 990.

In Example 2, a frame header or frame trailer boundary of (a time domain location or location of) a system frame that is located after the second system frame, that is closest to the second system frame, and whose frame number is a first frame number is a time reference point of the first time. For example, the frame number of the first system frame carried in the unicast message is 990, a frame number of a frame in which UE successfully receives the unicast message is 25, and the UE finds, after a time domain location of the frame 25, a frame 990 (whose time domain location is the 990 th frame of in a current period including 1024 frames) closest to the frame 25, and determines that the first time corresponds to a time corresponding to a frame header boundary or a frame trailer boundary of the frame 990.

In Example 3, a frame header or frame trailer boundary of (a time domain location or location of) a system frame that is located before or after the second system frame, that is closest to the second system frame, and whose frame number is a first frame number is a time reference point of the first time. For example, the frame number of the first system frame carried in the unicast message is 990, a frame number of a frame in which the UE successfully receives the unicast message is 25, and the UE finds, after a time domain location of the frame 25, a frame 990 (whose time domain location corresponds to the 990 th frame in a current period including 1024 frames) closest to the frame 25. A distance between the frame 990 and the frame 25 is 990−25=965 frames. The UE finds, before the time domain location of the frame 25, the frame (whose time domain location is the 990 th frame in a previous period including 1024 frames) closest to the frame 25. The distance between the frame 990 and the frame 25 is 25+1023-990=58 frames. After calculation, the frame 990 closest to the frame 25 is a frame whose time domain location is the 990 th frame in the previous period including 1024 frames, and it is determined that the first time corresponds to a frame header boundary or a frame trailer boundary of the frame 990.

Step 1104: The terminal device obtains the first time based on the first value. Further, the terminal device may obtain the fifth time based on the first time, and synchronize a time of the terminal device based on the fifth time.

In this embodiment, the first value may indicate the first time in a plurality of manners.

In a possible implementation, the time unit of the first time is preset. For example, the access network device and the terminal device pre-negotiate the time unit of the first time. In this case, the first value sent by the access network device may be used to indicate a value of the first time. Correspondingly, after receiving the first value, the terminal device may obtain the first time based on the first value indicated by indication information and the preset time unit of the first time. For example, if the preset time unit is 1 microsecond, and the first value received by the terminal device is 1, the first time is 1*1 microsecond=1 microsecond.

In another possible implementation, the time unit of the first time is explicitly indicated by the first value. In this case, the first value may include two parts of values (referred to as a first-part value and a second-part value for ease of description). The first-part value is used to indicate the time unit of the first time, and the second-part value is used to indicate the value of the first time. In this way, after receiving the first value, the terminal device may obtain the first time based on the value of the first time indicated by the first-part value and the time unit of the first time indicated by the second-part value.

In an example, the first-part value may include any one of 0, 1, and 2; and each of 0, 1, and 2 corresponds to different time accuracy. A specific correspondence may be preset. For example, a time unit corresponding to 0 is 1 microsecond, a time unit corresponding to 1 is 1 ns, and a time unit corresponding to 2 is 10 ns. In this way, after receiving the first value, if the terminal device determines that the value included in the first-part value is 0, the terminal device may determine that the time unit of the first time is 1 microsecond, and further may obtain the first time based on the value of the first time indicated by the second-part value.

In another example, the first-part value includes four bits in total. The first bit indicates whether a time unit of 1 ms is supported, the second bit indicates whether a time unit of 10 µs is supported, and the rest may be deduced by analogy. Assuming that 1 represents supporting, and 0 represents not supporting, when the terminal device determines that the first-part value is 1110, it indicates that a minimum granularity of time unit indicated by the time information sent by the access network device is 1 microsecond. Because the last bit is 0, it indicates that the time unit of 1 ns is not supported.

In this implementation, because the first value includes the first-part value used to indicate the time unit, this manner for indicating the time unit may be referred to as an explicit manner.

In another possible explicit manner, the first value may indicate the value of the first time, and the indication information independently indicates the time unit of the first time. In this case, the first value and the indication information may be sent in different messages. This is not specifically limited.

In still another possible implementation, the time unit of the first time is implicitly indicated by the first value. In this case, the first value may include values of a plurality of parameters, and the plurality of parameters correspond to different time units. In this way, the terminal device may obtain a plurality of times based on the values of the plurality of parameters and the time units corresponding to the plurality of parameters, and further obtain the first time based on a sum of the plurality of times. The values of the plurality of parameters may be separately carried by using a plurality of fields.

In an example, values carried in a total of four fields indicate time units of the first time. The time unit corresponding to the field 1 is 10 ms, the time unit corresponding to the field 2 is 1 ms to 10 ms, the time unit corresponding to the field 3 is 1 µs to 1 ms, and the time unit corresponding to the field 4 is 1 ns to 1 microsecond. If a field does not carry a value, for example, the field 3 does not carry a value, the terminal device may determine that the time unit of the first time is the time unit corresponding to the field 2, and no longer continues to parse the field 4, thereby effectively reducing processing overheads.

In this embodiment of this disclosure, when at least one of year, month, and day change, the access network device may send, to the terminal device by using a unicast message, the first time including year, month, day, . . . , and microsecond (using an example in which the time unit of the first time is microsecond). When none of year, month, and day changes subsequently, the access network device sends, to the terminal device by using the unicast message, a time including hour, minute, second, . . . , and microsecond, and does not send a time of a time unit of year, month, and day. In this way, after receiving the time that is sent by the access network device and that includes hour, minute, second, . . . , and microsecond, the terminal device may obtain the complete first time with reference to the previously stored year, month, and day. In an example, if the access network device does not send year, month, and day, the unicast message may carry indication information (which may be, for example, 1 bit), and the indication information is used to indicate a time unit that does not carry year, month, and day. In this way, the terminal device may obtain the previously stored year, month, and day based on the indication information. FIG. 11*c* shows the time information without year, month, and day.

It should be noted that the foregoing description is based on an example in which whether year, month, and day are sent. In another embodiment, the access network device may not send the time unit of year and month when year and month do not change, or may not send the time unit of year when year does not change. There may be a plurality of specific possibilities, and examples are not listed one by one.

Embodiment 9

Figure 12A:
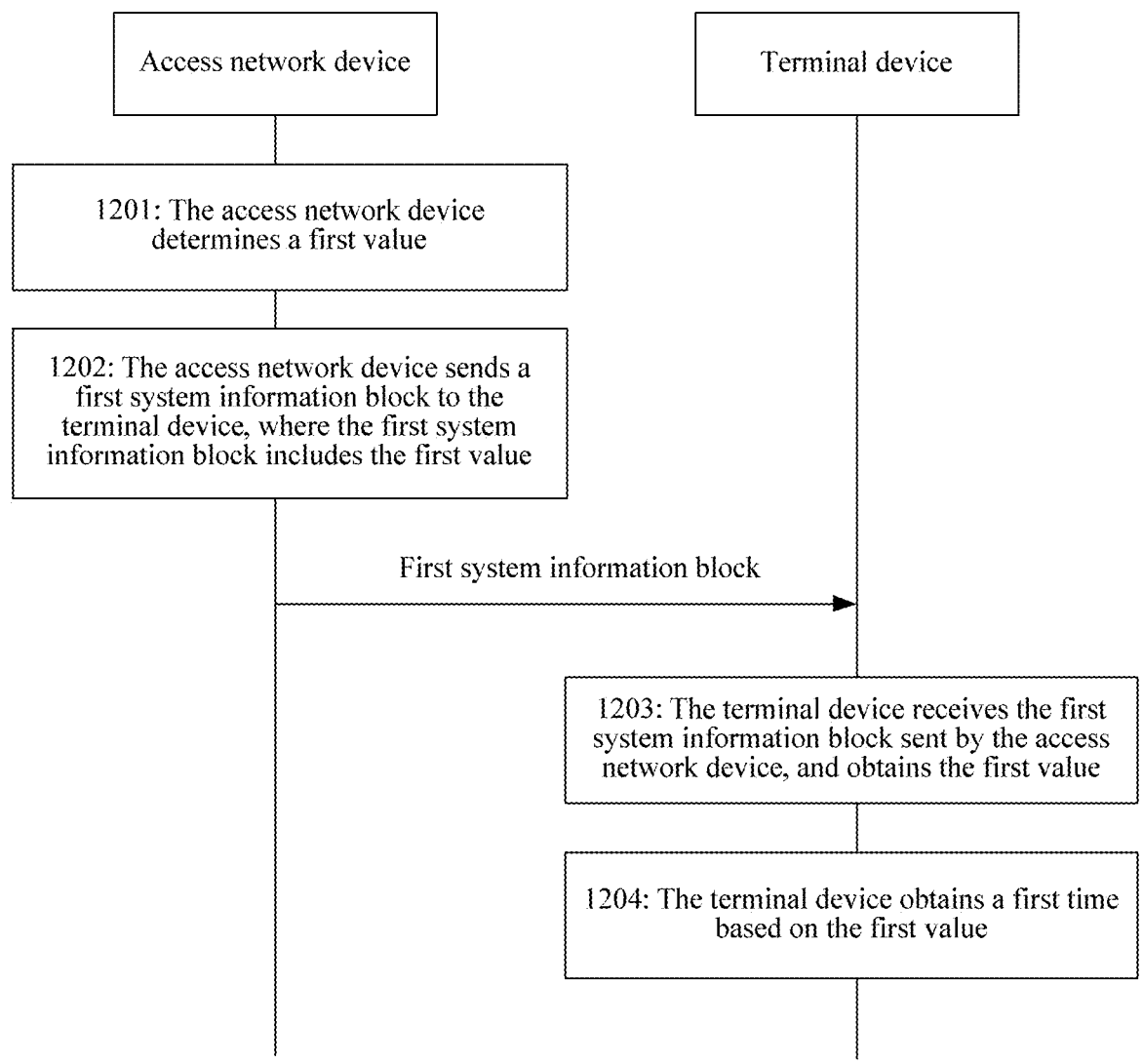
FIG. 12a is a schematic flowchart corresponding to a time synchronization method according to Embodiment 9 of this disclosure.

FIG. 12*a* is a schematic flowchart corresponding to a time synchronization method according to Embodiment 9 of this disclosure. As shown in FIG. 12*a*, the method includes the following steps.

Step 1201: An access network device determines a first value, where the first value is used to indicate a first time, and a time unit of the first time is n microseconds, n nanoseconds, n femtoseconds, or n milliseconds.

Step 1202: The access network device sends a first system information block to a terminal device, where the first system information block includes the first value.

Herein, the first system information block may be a SIB 16, or may be another system information block. This is not specifically limited.

Step 1203: The terminal device receives the first system information block sent by the access network device, and obtains the first value.

Step 1204: The terminal device obtains the first time based on the first value, further, may obtain a fifth time based on the first time, and synchronizes a time of the terminal device based on the fifth time.

In this embodiment, in a possible implementation, the SIB 16 may carry the first value, and all fields that carry the first value are fields of rig. In this case, for a manner of indicating the first time by the first value, refer to the description in Embodiment 8. In other words, in this implementation, a difference between Embodiment 9 and Embodiment 8 lies in that in Embodiment 9, the first value is received by using the first system information block, and in Embodiment 8, the first value is received by using the unicast message. For content other than this difference, mutual reference may be made.

In another possible implementation, time information includes the first value, and the first value includes first information and second information. The first information is used to indicate a second time, and the second information is used to indicate a third time. A time unit of the second time may be y milliseconds, and a time unit of the third time may be n microseconds, n nanoseconds, n femtoseconds, or n milliseconds.

Based on this implementation, in an example, the first system information block is a SIB 16, and a field carrying the first information is a field of r11 in the original SIB 16. Therefore, the time unit of the second time obtained based on the first information is 10 ms. A field carrying the second information is an extended field of r15. In other words, the access network device may newly add a field to the original SIB 16 through extension, and the newly added field carries the second information. For example, if the time unit of the first time is 1 microsecond, the third time indicated by the second information carried in the newly added field may range from 1 microsecond to 10 ms. FIG. 12*b* is a schematic diagram of an extended SIB 16. In this way, the terminal device may obtain, with reference to the original SIB 16, the second time whose time unit is 10 ms, then obtain, based on the newly added field, the third time whose time unit is at 1 microsecond granularity in a range of 10 ms, and obtain the first time (namely, timeInfoUTC-r11*10 ms+timeInfo-r15*1 microsecond) by combining the second time and the third time, where the time unit is accurate to 1 microsecond.

In another case of the foregoing example, if time units of the first time have fixed lengths, for example, Ts, as shown in FIG. 12C, the first time obtained by the terminal device is timeInfoUTC-r11*10 ms+timeInfo-r15*1 Ts, and a length of one Ts is 1/30.72 ns, which is approximately equal to 32.55 ns.

In another case of the foregoing example, the newly added timeInfo-r15 may alternatively be separately broadcast by using a new SIB (for example, a SIB 20). This is the case, described in Embodiment 10, in which the time information is sent by using a second system information block and a third system information block.

It should be noted that, in the solution described in the foregoing example, because the terminal device needs to obtain the first time with reference to the first information carried in the original SIB 16 and the second information carried in the newly added field, the solution requires that the terminal device in r15 need to support a feature of the SIB16 in r11, that is, a related field of r11 need to be listened on.

Further, in the foregoing example, the second information may indicate the third time in a plurality of manners. Specifically, refer to the manner for indicating the first time by the first value described in Embodiment 8. For example, FIG. 12*d* is a schematic diagram of a first value indicated in an explicit manner. In FIG. 12*d*, AccuracyIndicator-r15 INTEGER (0.3) indicates four types of time accuracy, which respectively represent 1 millisecond, 10 microseconds, 1 microsecond, and 1 nanosecond that are predefined in the protocol. FIG. 12*e* is a schematic diagram of a first value indicated in another explicit manner. In FIG. 12*e*, a time unit is indicated by using four bits. Details are not described again. The first information may indicate the second time in an existing implementation or in the manner described in Embodiment 8. Details are not described herein again.

In the foregoing Embodiment 9, the first value is broadcast by using one system information block. Because the terminal device can obtain the first value by parsing one system information block, and accuracy of the first time indicated by the first value is relatively high, accuracy of time synchronization performed by the terminal device can be ensured.

Embodiment 10

Figure 13:
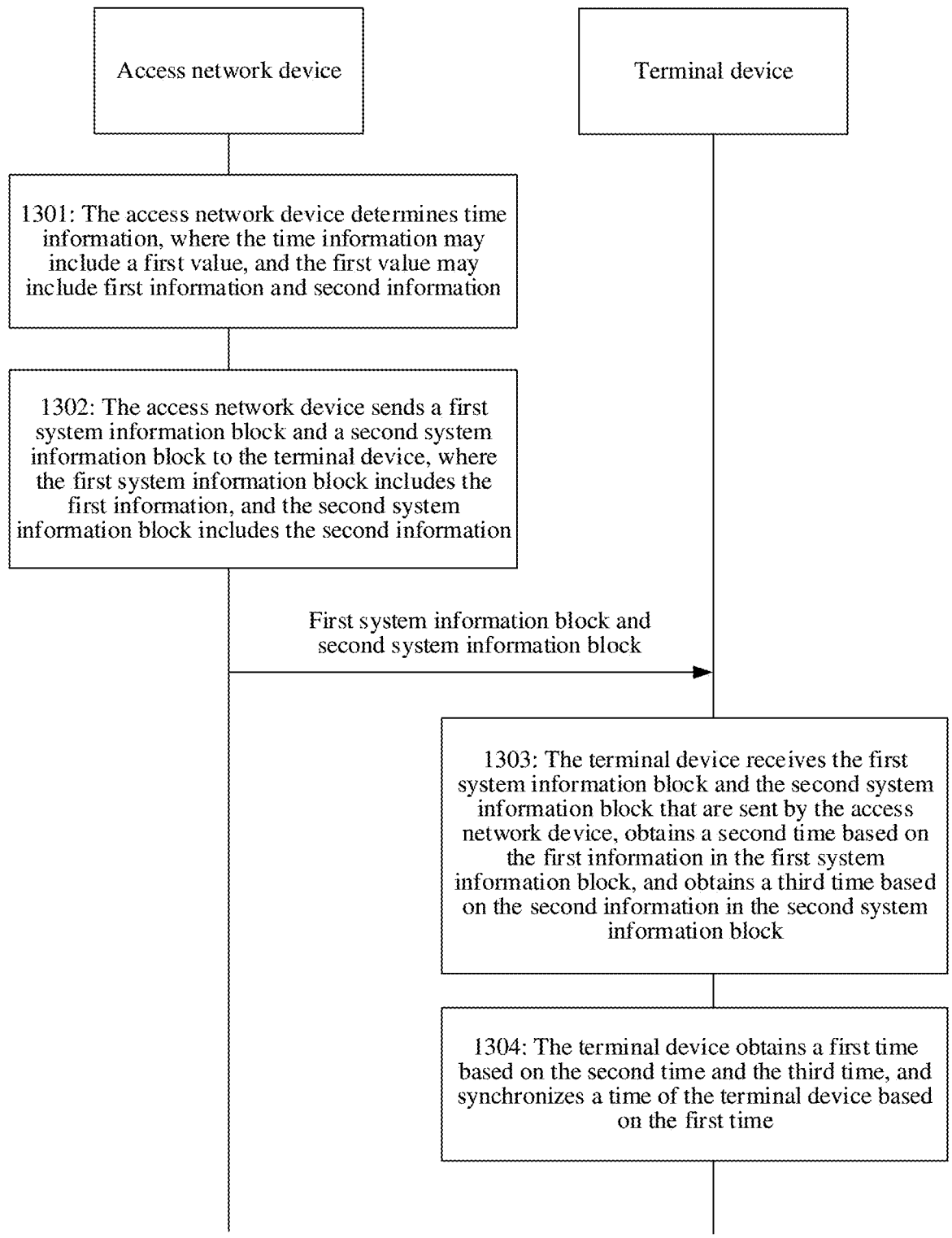
FIG. 13 is a schematic flowchart corresponding to a time synchronization method according to Embodiment 10 of this disclosure.

FIG. 13 is a schematic flowchart corresponding to a time synchronization method according to Embodiment 10 of this disclosure. As shown in FIG. 13, the method includes the following steps.

Step 1301: An access network device determines time information.

Herein, the time information includes a first value, and the first value may include first information and second information. The first information is used to indicate a second time, and the second information is used to indicate a third time. A time unit of the second time may be y milliseconds, and a time unit of the third time may be n microseconds, n nanoseconds, n femtoseconds, or n milliseconds.

Step 1302: The access network device sends a first system information block and a second system information block to a terminal device, where the first system information block includes the first information, and the second system information block includes the second information.

Step 1303: The terminal device receives the first system information block and the second system information block that are sent by the access network device, obtains the second time based on the first information in the first system information block, and obtains the third time based on the second information in the second system information block.

Step 1304: The terminal device obtains a first time based on the second time and the third time, and synchronizes a time of the terminal device based on the first time.

In this embodiment, the first system information block may be a SIB 16, and the second system information block may be another system information block, for example, a SIB 20. Further, a field carrying the first information is a field of r11 in the original SIB 16, and a field carrying the second information may be a newly added field of r15 in the SIB 20. There may be a plurality of manners in which the first information indicates the second time and a plurality of manners in which the second information indicates the third time. For details, refer to the description in Embodiment 9. Details are not described herein again.

In other words, a difference between Embodiment 10 and Embodiment 2 lies in that in Embodiment 9, the time information is sent by using one system information block, and in Embodiment 10, the time information is sent by using two system information blocks. For content other than this difference, mutual reference may be made.

Embodiment 11

Figure 14:
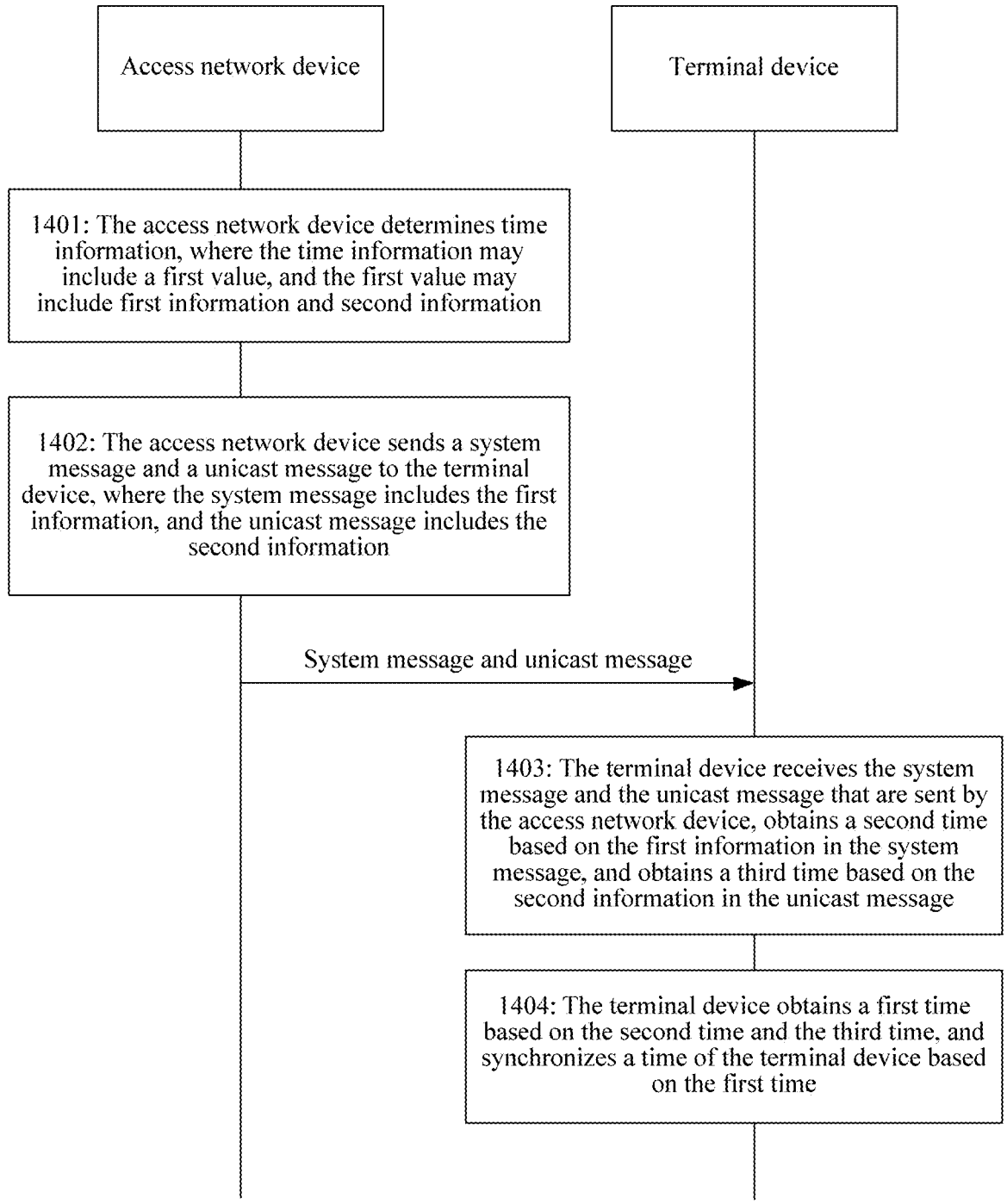
FIG. 14 is a schematic flowchart corresponding to a time synchronization method according to Embodiment 11 of this disclosure.

FIG. 14 is a schematic flowchart corresponding to a time synchronization method according to Embodiment 11 of this disclosure. As shown in FIG. 14, the method includes the following steps.

Step 1401: An access network device determines time information.

Herein, the time information includes a first value, and the first value may include first information and second information. The first information is used to indicate a second time, and the second information is used to indicate a third time.

Step 1402: The access network device sends a system message and a unicast message to a terminal device, where the system message includes the first information, and the unicast message includes the second information.

Herein, the unicast message may be an RRC message or a MAC CE. This is not specifically limited.

Step 1403: The terminal device receives the system message and the unicast message that are sent by the access network device, obtains the second time based on the first information in the system message, and obtains the third time based on the second information in the unicast message.

Step 1404: The terminal device obtains a first time based on the second time and the third time, and synchronizes a time of the terminal device based on the first time.

In an example, the access network device may broadcast the first information by using an original SIB 16, and send the second information by using the unicast message. This requires that before receiving the second information in the unicast message, the terminal device first need to listen to the system message carrying the first information, and a terminal device in a connected mode also need to listen to the system message.

For example, if a time unit of the first time is 1 microsecond, a time unit of the third time indicated by the second information carried in the unicast message ranges from 1 microsecond to 10 milliseconds, and a time unit of the second time indicated by the first information carried in the system message is 10 milliseconds. Alternatively, a time unit of the third time indicated by the second information carried in the unicast message ranges from 1 microsecond to 20 microseconds, and a time unit of the second time indicated by the first information carried in the system message is 20 microseconds.

Further, the unicast message may further carry a time information reference point, and the time information reference point is consistent with a time information reference point carried in the system message. Specifically, a time information reference point carried in the unicast message may be a time information reference point previously received by the terminal device or a currently stored time information reference point corresponding to a system. For example, if the terminal device receives the first information in the system message (for example, the SIB 16 or another SIB) in an SFN 1, and receives the second information in the unicast message in an SFN 6, a time information reference point corresponding to the second information in the unicast message is a time information reference point corresponding to the first information in the system message.

Further, in this embodiment of this disclosure, the second information may indicate the third time in a plurality of manners. For details, refer to the manner, described in Embodiment 8, in which the first value indicates the first time. Details are not described herein again. The first information may indicate the second time in an existing implementation or in the manner, described in Embodiment 8, in which the time information indicates the first time. Details are not described herein again.

It should be noted that the foregoing Embodiment 8 to Embodiment 11 are different implementations for the time synchronization method provided in this disclosure, and are all based on a same inventive concept. For content other than the differences between different embodiments, mutual reference may be made.

For the foregoing method procedure, an embodiment of this disclosure further provides a terminal device and an access network device. For specific implementations of the terminal device and the access network device, refer to the foregoing method procedures.

Figure 15:
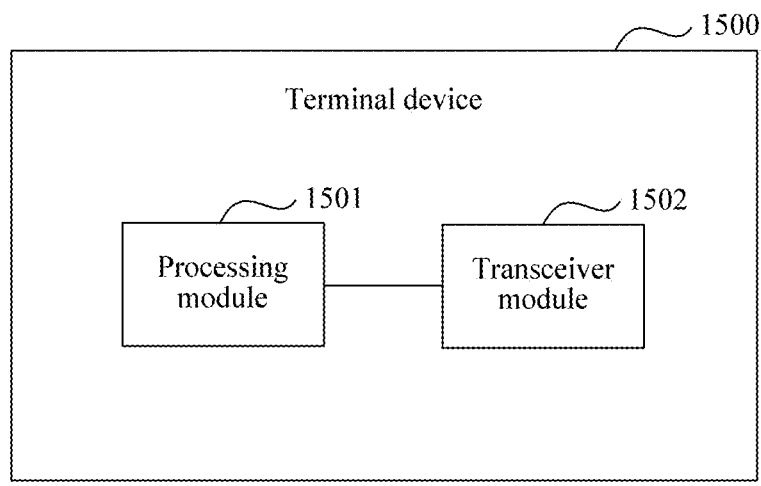
FIG. 15 is a schematic structural diagram of a terminal device according to an embodiment of this disclosure.

FIG. 15 is a schematic structural diagram of a terminal device according to an embodiment of this disclosure. The terminal device is configured to perform the procedure steps performed by the terminal device in Embodiment 8 to Embodiment 11. As shown in FIG. 15, the terminal device 1500 includes a processing module 1501 and a transceiver module 1502.

The transceiver module 1502 is configured to receive a first value sent by an access network device, where the first value is used to indicate a first time.

The processing module 1501 is configured to obtain the first time based on the first value, where a time unit of the first time is n microseconds, n nanoseconds, n femtoseconds, or n milliseconds, and n is greater than 0; and when the time unit is n milliseconds, n is less than 10.

In a possible design, the transceiver module 1502 is further configured to receive first indication information sent by the access network device by using a system message, a unicast message, or a multicast message, where the first indication information is used to indicate the time unit of the first time; and the processing module 1501 is specifically configured to obtain the first time based on a product of the first value and the time unit of the first time.

In a possible design, the time unit of the first time is a preset time unit; and the processing module 1501 is specifically configured to obtain the first time based on a product of the first value and the preset time unit.

In a possible design, the transceiver module 1502 is further configured to receive, in a broadcast, unicast, or multicast manner, a second time sent by the access network device, where a time unit of the second time is 10 milliseconds; and the processing module 1501 is specifically configured to obtain a third time by adding the first time and the second time.

In a possible design, the processing module 1501 is further configured to: obtain a fifth time based on a sum of the first time and a preset time, and synchronize a time of the terminal device based on the fifth time.

In a possible design, the transceiver module 1502 is specifically configured to receive a unicast message sent by the access network device, where the unicast message includes the first value.

In a possible design, the unicast message further includes a frame number of a first system frame; and the processing module 1501 is further configured to obtain, based on the frame number of the first system frame and a frame number of a second system frame, a first system frame corresponding to the fifth time, where the second system frame is a system frame of the first value.

In a possible design, the fifth time corresponds to a frame header boundary or a frame trailer boundary of the first system frame; and the first system frame is a system frame that is closest to the second system frame and whose frame number is equal to the frame number of the first system frame; or the first system frame is a system frame that is located before the second system frame, that is closest to the second system frame, and whose frame number is equal to the frame number of the first system frame; or the first system frame is a system frame that is located after the second system frame, that is closest to the second system frame, and whose frame number is equal to the frame number of the first system frame; or when the frame number of the first system frame is the same as the frame number of the second system frame, the first system frame is the second system frame.

In a possible design, the transceiver module 1502 is specifically configured to receive a first system information block sent by a network device, where the first system information block includes the first value.

In a possible design, the first value includes values of a plurality of parameters, and the plurality of parameters correspond to different time units; and the processing module 1501 is specifically configured to obtain the first time based on the values of the plurality of parameters included in the first value.

In a possible design, the transceiver module 1502 is further configured to send a first message to the access network device, where the first message is used to request the access network device to send the first value to the terminal device.

Figure 16:
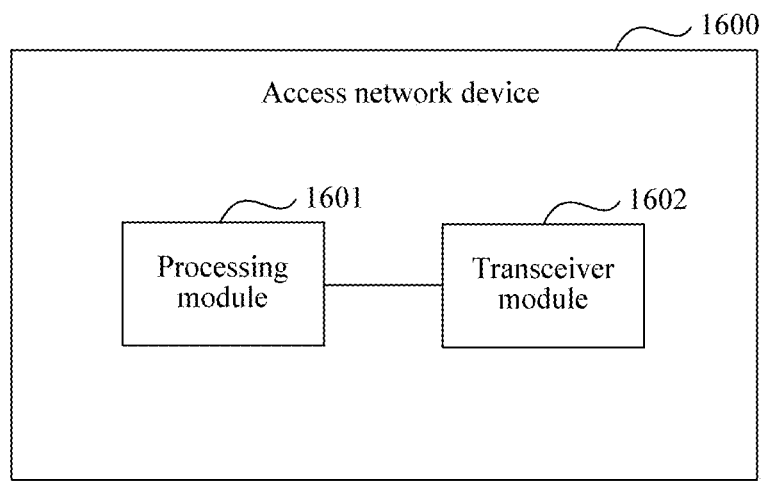
FIG. 16 is a schematic structural diagram of an access network device according to an embodiment of this disclosure.

FIG. 16 is a schematic structural diagram of an access network device according to an embodiment of this disclosure. The access network device is configured to perform the procedure steps performed by the access network device in Embodiment 8 to Embodiment 11. As shown in FIG. 16, the access network device 1600 includes a processing module 1601 and a transceiver module 1602.

The processing module 1601 is configured to determine a first value, where the first value is used to indicate a first time, a time unit of the first time is n microseconds, n nanoseconds, n femtoseconds, or n milliseconds, and n is greater than 0; and when the time unit is n milliseconds, n is less than 10.

The transceiver module 1602 is configured to send the first value to a terminal device.

In a possible design, the transceiver module 1602 is further configured to send first indication information to the terminal device by using a system message, a unicast message, or a multicast message, where the first indication information is used to indicate the time unit of the first time; and the first time is obtained by the terminal device based on a product of the first value and the time unit of the first time.

In a possible design, the time unit of the first time is a preset time unit, and the first time is obtained by the terminal device based on a product of the first value and the preset time unit.

In a possible design, the transceiver unit is further configured to send a second time to the terminal device in a broadcast, unicast, or multicast manner, where a time unit of the second time is 10 milliseconds; and a third time is obtained by the terminal device by adding the first time and the second time.

In a possible design, the transceiver module 1602 is specifically configured to send a unicast message to the terminal device, where the unicast message includes the first value.

In a possible design, the unicast message further includes a frame number of a first system frame; and a first system frame corresponding to a fifth time is obtained by the terminal device based on the frame number of the first system frame and a frame number of a second system frame, and the second system frame is a system frame in which the terminal device receives the first value.

In a possible design, the fifth time corresponds to a frame header boundary or a frame trailer boundary of the first system frame; and the first system frame is a system frame that is closest to the second system frame and whose frame number is equal to the frame number of the first system frame; or the first system frame is a system frame that is located before the second system frame, that is closest to the second system frame, and whose frame number is equal to the frame number of the first system frame; or the first system frame is a system frame that is located after the second system frame, that is closest to the second system frame, and whose frame number is equal to the frame number of the first system frame; or when the frame number of the first system frame is the same as the frame number of the second system frame, the first system frame is the second system frame.

In a possible design, the transceiver module 1602 is specifically configured to send a first system information block to the terminal device, where the first system information block includes the first value.

In a possible design, the first value includes values of a plurality of parameters, and the plurality of parameters correspond to different time units; and the first time is obtained by the terminal device based on the values of the plurality of the parameters.

In a possible design, the transceiver module 1602 is further configured to receive a first message sent by the terminal device, where the first message is used to request the access network device to send the first value to the terminal device.

Figure 17:
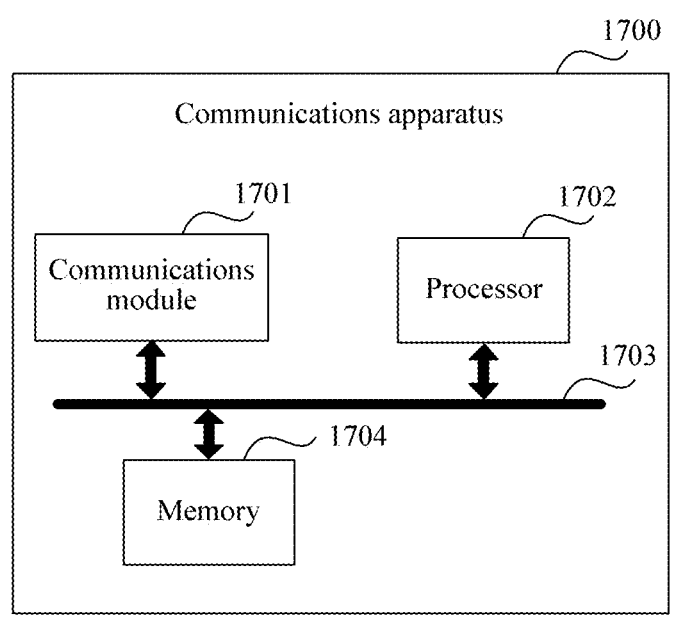
FIG. 17 is a schematic structural diagram of a communications apparatus according to an embodiment of this disclosure.

FIG. 17 is a schematic structural diagram of a communications apparatus according to an embodiment of this disclosure. The communications apparatus may be a terminal device or an access network device. The communications apparatus includes a communications module 1701 and a processor 1702.

The communications module 1701 is configured to perform communication interaction with another device, and the communications module may be an RF circuit, a Wi-Fi module, a communications interface, a Bluetooth module, or the like.

The processor 1702 is configured to implement a function of the processing module 1501 in FIG. 15 or a function of the processing module 1601 in FIG. 16.

Optionally, the communications apparatus may further include a memory 1704, configured to store a program and the like. Specifically, the program may include program code, and the program code includes an instruction. The memory 1704 may include a random access memory (RAM), or may include a non-volatile memory, for example, at least one magnetic disk memory. The processor executes the disclosure program stored in the memory to implement the foregoing functions.

In a possible manner, the communications module 1701, the processor 1702, and the memory 1704 may be connected to each other by using a bus 1703. The 1703 bus may be a peripheral component interconnect (PCI) bus, an extended industry standard architecture (EISA) bus, or the like. The bus may be classified into an address bus, a data bus, a control bus, and the like.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or system (for example, infrared, system, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

This disclosure is described with reference to the flowcharts and/or block diagrams of the method, the device (system), and the computer program product according to this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this disclosure without departing from the spirit and scope of this disclosure. This disclosure is intended to cover these modifications and variations of this disclosure provided that they fall within the scope of protection defined by the following claims and their equivalent technologies.

What is claimed is:

1. A method, comprising:
receiving, by a terminal device, a first frame number and a first value from an access network device, wherein the first value is used to calculate a first time period;
obtaining, by the terminal device, a reference time based on a sum of the first time period and a preset time; and
synchronizing, by the terminal device, a time of the terminal device based on the reference time, wherein a first system frame indicates a time domain location corresponding to the reference time, the first system frame is closest to a second system frame, a frame number of the first system frame is equal to the first frame number, and the terminal device receives the first value in the second system frame.

2. The method according to the claim 1, wherein the time domain location corresponding to the reference time is a frame header boundary or a frame ending boundary of the first system frame.

3. The method according to the claim 1, wherein receiving, by the terminal device, the first frame number and the first value from the access network device comprises:
receiving, by the terminal device, a unicast message from the access network device, wherein the unicast message comprises the first value or the first frame number.

4. The method according to claim 1, wherein the first value comprises values of a plurality of parameters, the plurality of parameters correspond to different time units, and the values of the plurality of parameters are used to calculate the first time period.

5. A method, comprising:
determining, by an access network device, a first frame number and a first value, wherein the first value is used to calculate a first time period, the first time period is used to determine a reference time, and the reference time is used to synchronize a time of a terminal device; and
sending, by the access network device, the first frame number and the first value to the terminal device, wherein a first system frame indicates a time domain location corresponding to the reference time, the first system frame is closest to a second system frame, a frame number of the first system frame is equal to the first frame number, and the terminal device receives the first value in the second system frame.

6. The method according to the claim 5, wherein the time domain location corresponding to the reference time is a frame header boundary or a frame ending boundary of the first system frame.

7. The method according to the claim 5, wherein sending, by the access network device, the first frame number and the first value to the terminal device comprises:
sending, by the access network device, a unicast message to the terminal device, wherein the unicast message comprises the first value or the first frame number.

8. The method according to claim 5, wherein the first value comprises values of a plurality of parameters, the plurality of parameters correspond to different time units, and the values of a plurality of parameters are used to calculate a first time period.

9. A device, comprising:

a processor; and a non-transitory computer-readable storage medium coupled to the processor and storing programming instructions for execution by the processor, wherein the programming instructions instruct the processor to:

receive a first frame number and a first value from an access network device, wherein the first value is used to calculate a first time period;

obtain a reference time based on a sum of the first time period and a preset time; and synchronize a time of the device based on the reference time, wherein a first system frame indicates a time domain location corresponding to the reference time, the first system frame is closest to a second system frame, a frame number of the first system frame is equal to the first frame number, and the device receives the first value in the second system frame.

10. The device according to the claim 9, wherein the time domain location corresponding to the reference time is a frame header boundary or a frame ending boundary of the first system frame.

11. The device according to the claim 9, wherein receiving the first frame number and the first value from the access network device comprises:

receive a unicast message from the access network device, wherein the unicast message comprises the first value or the first frame number.

12. The device according to claim 9, wherein the first value comprises values of a plurality of parameters, the plurality of parameters corresponds to different time units, and the values of the plurality of parameters are used to calculate a first time period.

13. A device, comprising:

a processor; and a non-transitory computer-readable storage medium coupled to the processor and storing programming instructions for execution by the processor, the programming instructions instruct the processor to:

determine a first frame number and a first value, wherein the first value is used to calculate a first time period, the first time period is used to determine a reference time, and the reference time is used to synchronize a time of a terminal device; and send the first frame number and the first value to the terminal device, wherein a first system frame indicates a time domain location corresponding to the reference time, the first system frame is closest to a second system frame, a frame number of the first system frame is equal to the first frame number, and the terminal device receives the first value in the second system frame.

14. The device according to the claim 13, wherein the time domain location corresponding to the reference time is a frame header boundary or a frame ending boundary of the first system frame.

15. The device according to the claim 13, wherein sending the first frame number and the first value to the terminal device comprises:

sending a unicast message to the terminal device, wherein the unicast message comprises the first value or the first frame number.

16. The device according to claim 13, wherein the first value comprises values of a plurality of parameters, the plurality of parameters correspond to different time units, and the values of a plurality of parameters are used to calculate a first time period.

* * * * *